US011829575B1

(12) United States Patent
Luvaas et al.

(10) Patent No.: US 11,829,575 B1
(45) Date of Patent: *Nov. 28, 2023

(54) WORKFLOW ASSEMBLY TOOL AND WORKFLOW MODEL

(71) Applicant: Amazon Technologies, Inc., Seattle, WA (US)

(72) Inventors: Darren Jon Luvaas, Bainbridge Island, WA (US); Vu Nguyen, Seattle, WA (US); Christina Lane, Kent, WA (US); Nirmala V. Sistla, Sammamish, WA (US); Hefeng Cui, Mukilteo, WA (US); Tharif Afzal, Redmond, WA (US); Congzhou Wang, Renton, WA (US); Ashwin Ravichandran, Seattle, WA (US); Shashank Kumar Sharma, Lynnwood, WA (US); Weiwei Jia, Seattle, WA (US); Sharon Brown, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,669

(22) Filed: Jul. 20, 2022

Related U.S. Application Data

(63) Continuation of application No. 17/323,246, filed on May 18, 2021, now Pat. No. 11,435,871.

(51) Int. Cl.
*G06F 3/04817* (2022.01)
*G06F 9/38* (2018.01)
(Continued)

(52) U.S. Cl.
CPC ........ *G06F 3/04817* (2013.01); *G06F 9/3005* (2013.01); *G06F 9/3017* (2013.01); *G06F 9/3836* (2013.01); *G06F 9/451* (2018.02)

(58) Field of Classification Search
CPC ............................ G06F 3/04817; G06F 9/451
See application file for complete search history.

(56) References Cited

U.S. PATENT DOCUMENTS

| 2005/0160398 A1* | 7/2005 | Bjornson | ............... G06Q 10/06 717/104 |
| 2006/0074735 A1* | 4/2006 | Shukla | ................. G06Q 50/188 705/80 |

(Continued)

OTHER PUBLICATIONS

U.S. Appl. No. 17/323,246, Notice of Allowance, dated Apr. 27, 2022, 9 pages.

*Primary Examiner* — Mong-Shune Chung
(74) *Attorney, Agent, or Firm* — Kilpatrick Townsend & Stockton LLP

(57) ABSTRACT

Techniques for generating a workflow model are described. In an example, a device presents a window. A selection of an icon presented in the window is received, where the icon corresponds to a node having a node type. Based on rule, the device determines a location where the icon can be added to a workflow. The rule indicates the location based on the node type and a workflow model. The user device presents, in the window, an indicator of the location, receives a placement of the node at the location, and presents, the icon at the location indicating that the node is added to the workflow. The device updates the workflow model to include, based on the placement, a reference to executable code that corresponds to the node, and to include, based on the location, information about an execution sequence of executable codes referenced in the workflow model.

20 Claims, 14 Drawing Sheets

(51) Int. Cl.
    *G06F 9/30*      (2018.01)
    *G06F 9/451*    (2018.01)

(56) References Cited

U.S. PATENT DOCUMENTS

| | | |
|---|---|---|
| 2014/0229846 A1 | 8/2014 | Abaya et al. |
| 2016/0092059 A1 | 3/2016 | Tu et al. |
| 2020/0097266 A1* | 3/2020 | Lodhia ............... G06F 8/34 |
| 2020/0285449 A1* | 9/2020 | McIntosh ............ G06V 10/82 |
| 2021/0203569 A1 | 7/2021 | Garty et al. |
| 2022/0044131 A1* | 2/2022 | Rayes ............... G06F 40/30 |

\* cited by examiner

WORKFLOW ASSEMBLY TOOL AND WORKFLOW MODEL

CROSS-REFERENCE TO RELATED APPLICATION

This application claims priority to and is a continuation of U.S. patent application Ser. No. 17/323,246, filed May 18, 2021, and entitled "WORKFLOW ASSEMBLY TOOL AND WORKFLOW MODEL FOR RUNTIME EXECUTION," the content of which is hereby incorporated by reference in its entirety for all purposes.

BACKGROUND

Different types of applications are available to assist users with processing data and generating new data, analytics, and reports. An application typically supports a set of functions. For example, a spreadsheet application allows a user to organize data in columns and rows and perform transformations thereon. If two different sets of functions are desired, the user may need to rely on two different applications. Otherwise, a programmer may have to develop and code a new application that supports both function sets.

BRIEF DESCRIPTION OF THE DRAWINGS

Various embodiments in accordance with the present disclosure will be described with reference to the drawings, in which.

DETAILED DESCRIPTION

Figure 1:
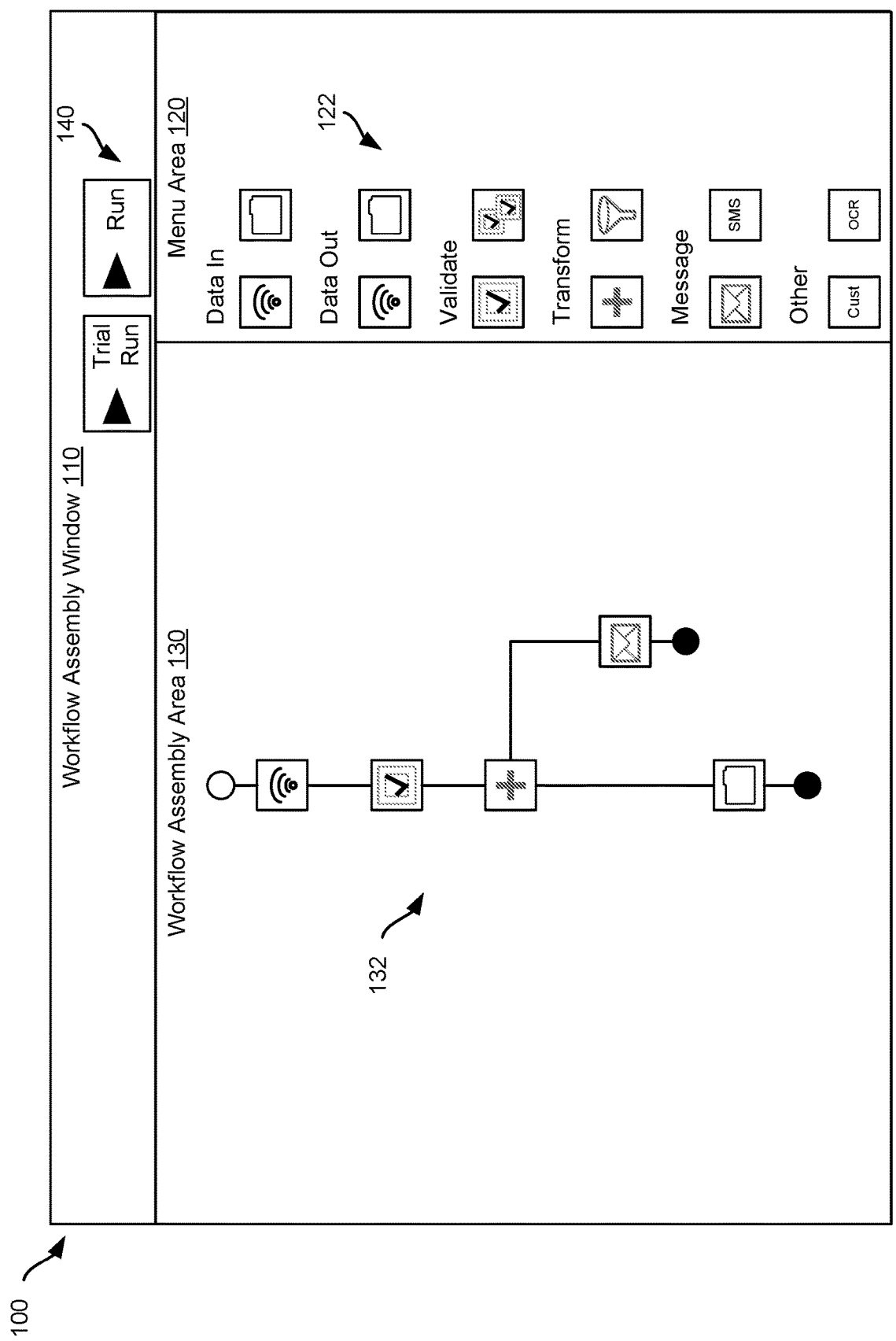
FIG. 1 illustrates an example of a user interface (UI) of a workflow assembly application, according to certain embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, developing and executing a workflow for automated data processing and automated generated of new data, analytics, and reports. In an example, a workflow assembly application is executed on a device and presents a user interface (UI). Nodes are predefined, each corresponding to executable code that, upon execution, provides a set of functions. The executable codes can be stored in a data store that may be remote from the device. The UI shows the nodes as selectable icons from a first area of the user interface (e.g., menu area) and allows users selections of such icons to define a workflow in a second area of the UI (e.g., a workflow assembly area). In particular, a set of icons is selected from the first area and added to the second area and connections therebetween are specified to generate the workflow. While the user input is received, information is also shown in the first area and/or the second area to guide the icon placement and the connection specification such that the resulting workflow is properly executable. For instance, a first icon is added to the second area indicating that a first corresponding node is added to the workflow. Next, a second node is selected from the first area. In response, the workflow assembly application determines a possible set of locations to place the icon in the second area based on the node types of the first node and the second node. This set is indicated in the second area and a placement of the second node in one of the locations is received, indicating that a second corresponding node is also added to the workflow. The relative placements of and/or the connection between the two nodes indicates a sequence for executing a first executable code that corresponds to the first node and a second executable code that corresponds to the second node. Parameters of the nodes can be configured via the UI by receiving user input specific to each icon in the second area. A workflow model is defined, whereby references to the first and second executable codes from the data store are included in the workflow model along with information about the sequence of execution and the configuration parameters. Once the workflow is defined, the resulting workflow model can be stored. At runtime, the workflow model is parsed to identify the executable codes, the execution sequence, and the configuration parameters. Runtime execution is performed accordingly and an output of the execution can be presented at the UI.

To illustrate, consider an example of defining a tax workflow. Two sets of data are to be input to the tax workflow, the first one corresponding to the current year and the second one to the previous year, and each available from a different data source (e.g., from two source files stored at different servers). A data transformation needs to be defined for an operation on the data sets (e.g., to sum two columns in the data sets). The new data set is to be uploaded to a data destination (e.g., a destination file stored at a server). Here, the workflow application tool can be used. In a menu area, the workflow assembly application shows at least three icons: a data import icon, a data transformation icon, and a data upload icon. Each of such icons corresponds to a possible node that can be added to the tax workflow and that has corresponding executable code (e.g., code executable to import data, code executable to merge data, and code executable to upload data). Via the UI, the data import icon is selected from the menu area and placed in a workflow assembly area, thereby adding a first data import node to the tax workflow. The data import icon is selected again and placed in the workflow assembly area in parallel to the other, already added data import icon (e.g. to its left or right), thereby adding a second import node of the tax workflow. Each of these two data import nodes are configured, via their respective data import icon, to import the corresponding data set (e.g., by specifying the data source). A workflow model is generated and references the executable data import code twice, each with a different configuration parameter (e.g., the specific data source). Next, the data transformation icon is selected from the menu area. Given the corresponding node type (e.g., data transformation), the workflow assembly application determines that the data transformation icon should have at least two input branches. Given that the two data import nodes have already been added to the tax workflow, the workflow assembly application determines that a possible placement location of the data transformation icon in the workflow assembly area is down from the first and second data import icons with a connection to each of them. A visual indicator is presented in the workflow assembly area about this placement location. Upon the data transformation icon being placed at that location, a data transformation node is added to the tax workflow and the workflow model is updated to include a reference to the executable data transformation code, and to include information indicating that this code is executable after completion of the data imports and that the imported data are input to the executable data transformation code. Thereafter, the data upload icon is selected from the menu area. Similarly here, the workflow assembly application determines that the possible placement of the data upload icon in the workflow assembly area is down from the data transformation icon and presents a corresponding visual indicator. Upon the location placement, a data upload node is added to the tax workflow. This node is configured via the data upload icon in the workflow assembly area (e.g., to specify the data destination and file type). The workflow model is updated to reference the executable data upload code and to include information sequencing its execution after the data transformation is complete and identifying the data destination and file type. The workflow model can be stored at a server and can be run therefrom on-demand, according to a schedule, and/or upon a trigger event (e.g., updates to the two data sources).

Embodiments of the present disclosure provide several technological advantages over conventional systems including, automation, accuracy, and scalability. For example, the embodiments allow a user to define a workflow that integrates and functions that, otherwise, would be available from separate program applications and necessitate manual user input to move the data between these different applications. Because the manual input can be avoided, the accuracy of the workflow can be improved, whereby user-induced errors may be eliminated. Further, the workflow assembly application provides a user-intuitive and guided tool to develop a properly executable workflow. The user need not be a programmer and need not have to create new program applications. Various different types of workflows can be developed, stored, modified over time, and made available to or shared between multiple users, thereby providing a scalable workflow platform.

In the interest of clarity of explanation, embodiments of the present disclosure are described in connection with examples of graphical user interface (GUI) layouts, icons, and corresponding nodes. However, the embodiments are not limited to such examples and similarly apply to other representations of nodes of a workflow and user input and output modalities to define the workflow and/or trigger execution of the codes corresponding to the nodes of the workflow. For instance, other GUI layouts are possible or the use of other input modalities that may not rely on icons are possible. In a particular illustration, rather than using icon, a workflow assembly application can present, on a GUI, linked texts or other graphical elements as representations of the nodes. In another illustration, a chat bot may be provided by a workflow assembly application. Structured input or unstructured input (e.g., natural language input) may be received by the chat bot to then define the workflow and/or trigger its execution. In a further illustration, a user may interact with a voice-controlled device to define a workflow. The voice-controlled device supports a voice interface and executes a workflow assembly application. Upon execution, the voice-controlled device informs the user about a menu of available nodes (e.g., by playing audio messages), receives user selections of particular nodes (e.g., by detecting natural language speech inputs), informs the user about their possible placement relative to other nodes of the workflow (e.g., by playing audio messages), receives user placements of the nodes (e.g., by detecting natural language speech inputs), and updating the corresponding workflow model.

FIG. 1 illustrates an example of a UI 100 of a workflow assembly application, according to certain embodiments of the present disclosure. The workflow assembly application can be executed on a device, as further illustrated in the next figures. In an example, the UI 100 is a GUI that shows a workflow assembly window 110 of the workflow assembly application. The workflow assembly window 110 supports user interactions to generate a workflow.

In the illustration of FIG. 1, the workflow assembly window 110 includes a menu area 120 and a workflow assembly area 130. The menu area 120 can present icons 122 available for selection, where each icon corresponds to a node type. Icons can be selected from the menu area 120 and placed in the workflow assembly area 130 to generate the workflow. The placed icons 132 correspond to nodes of the workflow, each node having a node type and associated with executable code. The workflow is visualized in the assembly area 130 as the set of the placed icons 132 and the connections therebetween. The workflow assembly application generates a workflow model that represents the workflow by, for instance, identifying the nodes, their node types, their configurations, and the connections therebetween, and referencing the executable codes of these nodes and their execution sequence. Further, the workflow assembly window 110 includes options 140 (shown as "trial run" and "run" in FIG. 1) selectable to execute the workflow. The selection of one of these options trigger an execution of the executable codes referenced in the workflow model, where the execution follows the execution sequence. As further illustrated in the next figures, upon the execution of the workflow model, generated data and reports can be further presented in the workflow assembly window 110.

In an example, the workflow assembly window 110 is implemented using Hypertext Markup Language (HTML) and Cascading Style Sheet (CSS). The menu area 120 organizes the icons 122 by node types and identifies such node types. In the illustration of FIG. 1, these node types include data in, data out, validate, transform, message, and other (although the use of other node types is possible). Under each node, multiple icons can be shown, each of which is associated with a predefined node that can be added to a workflow.

Data in refers to nodes usable to receive data, such as to import data, or load data via an application programing interface (API), from a catalog, from a file, or from a database. Data out refers to nodes usable to send data, such as to export data, upload data, or store data via an API, to a catalog, to a file, or to a database. Validate refers to nodes usable to validate data received using a data in node. The validation can be a file check, a data quality check, a reconciliation against other data, or a schema check. Transform refers to nodes usable to transform data received using a data in node and/or validated using a validate node. The transformation can be adding data fields, aggregating data fields, converting data fields, filtering data fields, filtering data records, joining data fields, or managing data fields. Message refers to nodes usable to send communication about data, such as by logging an entry, sending an electronic mail message, sending a cellular text message, or sending a message using a particular communication application. Other refers to nodes usable to perform other functions, such as creating a ticket, creating a custom function (e.g., whereby user can add an API call to another application, upload or include executable code; this node allows a technical users to enter code for execution as a part of the workflow. This code can be entered in Javascript, Python, structured query language (SQL), or any number of other programming languages), performing Optical Character Recognition (OCR), link to other workflows, or add specific user input. Of course, these node types are provided herein for illustrative purposes and additional or different node types can be possible. For instance, reports and events are additional node types (not illustrated in FIG. 1). Reports refers to nodes usable to create reports or format data. Events refers to nodes usable to broadcast data events or subscribe to data events.

The workflow assembly area 130 can be a canvas or a workspace area where icons 122 selected from the menu area 120 can be placed. This placement can be via different types of input means. For example, drag-and-drop operations can be supported. As further illustrated in the next figures, when an icon is selected, and depending on the corresponding node type and the current workflow model (e.g., the nodes already added to the workflow mode, their node types, and the dependencies between them), visual indicators can be presented in the workflow assembly area 130 to indicate to the user possible placement locations of the icon. Upon placing the icon at a particular placement location, the workflow model is updated to identify the added node and its node type, reference the corresponding executable code, and the dependency to the already added nodes (e.g., an update to the execution sequence).

The options 140 can trigger the execution of the workflow (or, more specifically, the parsing of the workflow model and execution of the referenced executable codes according to the execution sequence and the configuration information of each node). FIG. 1 illustrates two options: a run and a trial run. The run represents manual trigger for executing the workflow at runtime by using the data set(s) to which the workflow applies. In comparison, the trial run represents another manual trigger, but for executing the workflow by using a portion of the data set(s) (e.g., instead of all the data entries, the trial run uses the first two-hundred data entries (or some other configured number) or a data byte amount (e.g., one gigabyte of the data)). This way, the trial run allows the validation of the workflow by using the real, applicable data, but without the need to process the entire data set(s). Other triggers for the execution are possible. For example, a schedule with recurrent runtime execution. In another example, a data event can be subscribed to and, upon receiving, an indication of its occurrence, a runtime execution can be automatically performed.

Although FIG. 1 shows that an icon has the same representation in the menu area 120 and the workflow assembly area 130, the embodiments of the present disclosure are not limited as such. For example, the representation of the icon in the menu area 120 can include a graphical element with, optionally, text indicating a node type (e.g. a display name). When the icon is added to the workflow in the workflow assembly area 130, its presentation can be updated. For instance, its presentation is expanded to include additional information indicating that the corresponding node has been added such to give the appearance to the user that the node now appears in the workflow. This appearance can include the graphical element (resized), the display name, and a selectable option (e.g., for a spillover menu) with a surrounding bounding box.

Figure 2:
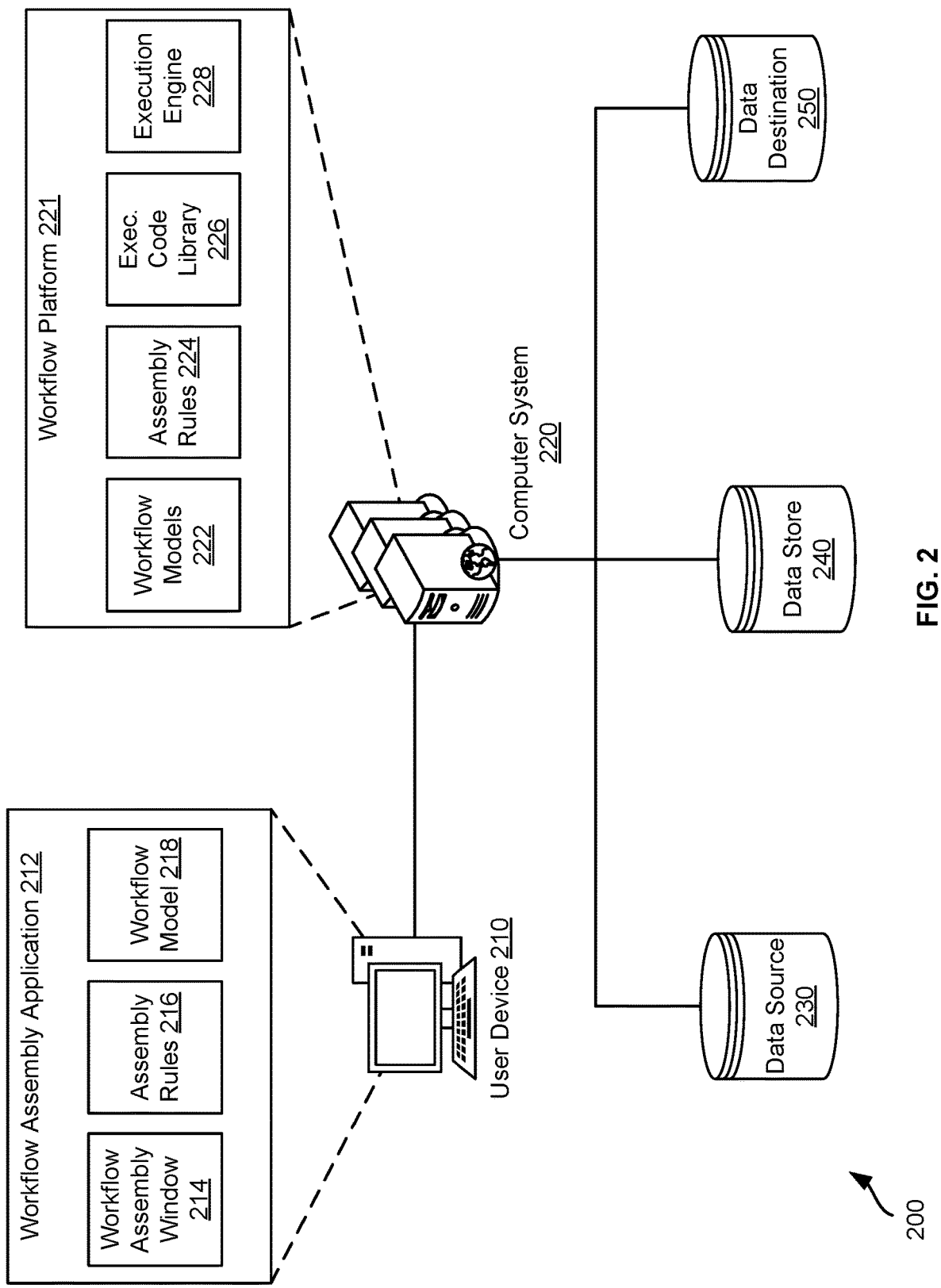
FIG. 2 illustrates an example of a computing environment that provides a workflow assembly tool and runtime execution of a workflow, according to certain embodiments of the present disclosure.

FIG. 2 illustrates an example of a computing environment 200 that provides a workflow assembly tool and runtime execution of a workflow, according to certain embodiments of the present disclosure. As illustrated, the computing environment 200 includes a user device 210, a computer system 220, a data source 230, a data store 240, and a data destination 250, among other components. The user device 210 executes a workflow assembly application 212 to define a workflow and a trigger (manually and/or based on a schedule and/or data events) for its runtime execution. The computer system 220 can host a workflow platform 221 to facilitate the workflow definition, execute the workflow, and send an execution report to the user device 210 and/or other devices. Data to be processed by the workflow can be available from the data source 230 (and, possibly, other data sources). The data output by the workflow can be stored in the data destination 250 (and, possibly, other data destinations). Intermediary data corresponding to the processing by a node of the workflow can be stored in the data store 240 (and, possibly, other data stores).

In an example, the user device 210 is a computing device suitable to execute the workflow assembly application 212 and to communicate with the computer system 220 over a data network. Generally, the user device 210 includes one or more processors and one or more memories storing computer-readable instructions associated with the workflow assembly application 212 (e.g., the program code of this application 212). The user device 210 can be a smartphone, a tablet, a laptop, a desktop computer, or the like. In comparison, the computer system 220 can be a set of servers or a set of virtualized computing resources on servers (e.g., a cloud-computing service). Each of the data source 230, data store 240, and data destination 250 represents a storage location accessible to the computer system 220 and/or the user device 210. A storage location can be a local hard drive of the user device 210, a local hard drive of the computer system 220, a cloud-based data store, or a data store from a remote system accessible over a data network. Different data storage types are also possible, including files, databases, and the like.

Although FIG. 2 illustrates these different components as being separate from each other, one or more of these components can be integrated. For instance, the data source 230 and the data destination 250 can be components of the user device 210, whereas the data store 240 can be a component of the computer system 220. Further, the computing environment 200 can include other user devices in communication with the computer system 220. For instance, the user device 210 is usable to define a workflow. The resulting workflow model can be stored by the computer system 220 and made available to other user devices via the workflow platform 221. Additionally or alternatively, such user devices can subscribe to the outputs of runtimes executions of the workflow.

In an example, the workflow assembly application 212 presents a workflow assembly window 214, similar to the workflow assembly window 110 of FIG. 1. The workflow assembly application 212 also uses assembly rules 216 to facilitate the creation of a workflow. The assembly rules 216 can be received from the workflow platform 221 independently of the workflow being created or in-real time relative to its creation. Generally, the assembly rules 216 specify placement locations for adding icons to a visualization of the workflow, where the placement locations correspond to how the nodes of the workflow are connectable. These placement locations are indicated (e.g., by using visual indicators) in the workflow assembly window 214. The placement locations can be determined given a node type corresponding to a selected icon, node types of other nodes already added to the workflow model, and the dependencies between such nodes.

During the creation of the workflow, the workflow assembly application 212 can generate and maintain the corresponding workflow model 218. Further, during the creation, the workflow assembly application 212 can synchronize the workflow model 218 with a copy thereof, where this copy is stored by the computer system 220. Additionally or alternatively, after the creation, the workflow assembly application 212 can send a copy of the workflow model 218 to the computer system 220 for storage thereat.

The workflow model 218 includes definitions of the workflow. The workflow model 218 itself need not be new executable code that the workflow assembly application 212 generates or that a user codes by using the user device 210. Instead, the workflow model 218 can indicate the executable codes of the workflow's nodes and related configurations, where the executable codes are predefined and available from the workflow platform 221, and where the configurations are set by a user via the workflow assembly application 212. For instance, the workflow model 218 includes an identifier of the workflow, identifiers of the nodes, identifiers of the node types of the nodes, configuration parameters of the nodes (e.g., identifiers of data sources and data destinations, specific parameters of a data transformation, specific schema or file identifier for data validation, or the like), references to the executable codes of the nodes (e.g., links to where these executable codes are stored), and an execution sequence of the executable codes. In an example, the workflow model 218 can be defined as an object model, such as a JavaScript Object Notation (JSON) model, that contains multiple objects, each representing a node and including properties of the node.

The workflow platform 221 can store multiple workflow models 222, some of which may be received from the user device 210, and others may be received from other user devices and available to the user device 210. The workflow platform 221 can also maintain assembly rules 224, a subset or the entirety of which can be sent to the workflow assembly application 212 to support the workflow creating. Further, the workflow platform 221 can maintain a library 226 of executable codes, of which can correspond to a node type. Executable code can be application program code or code of an API for an application that may reside on a remote system. The executable codes can be predefined by a service provider of the workflow platform 221 or collected over time from one or more users. The workflow platform 221 can also include an execution engine 228 for runtime executions of the workflow models 222. For instance, the workflow models 222 include a copy of the workflow model 218. The execution engine 228 parses this copy, determines the executable codes and their execution sequence and parameters, and uses the library 226 to then execute each executable code according to the execution sequence and the parameters of that executable code. Data generated by the execution of the executable code can be stored in the data store 240 and, depending on the execution sequence, can be input to the next executable code. The final data output can be stored in the data destination 250.

In an example, the workflow model 218 can be defined in a sandbox and may have an inactive state. In the active state, the workflow mode 218 can be executed via the user device 210 but not via other devices. The workflow platform 221 can support a review and approval process. In particular, a user may indicate via the user device 210 that the workflow model 218 should be published or made available to other users (e.g., to other user accounts and/or other user devices). Upon this indication, the workflow platform 221 may generate and send notifications to the relevant approval authorities (e.g., other user accounts with approval privileges) to review and approve the workflow model 218. Upon receiving the necessary approvals, workflow platform 221 can change the state of the workflow model 218 to activate, thereby rendering it accessible to the other users.

Furthermore, the workflow platform 221 may support a versions system that allows users to declare versions for a workflow and dependencies on specific versions for the purposes of encapsulation of nested workflows within parent workflows. As further described herein below, a workflow can encapsulate multiple workflows, each of which can encapsulate one or more other workflows (e.g., encapsulated sub-workflows) and/or one or more nodes. The versioning system also allows the users to define versions per node and/or encapsulated sub-workflow and configure the workflow to use a particular set of versions (e.g., by defining APIs to the relevant nodes/encapsulated sub-workflows)) for execution. The versioning system also allows users to specify specific versions of workflows to run on schedules.

Figure 3:
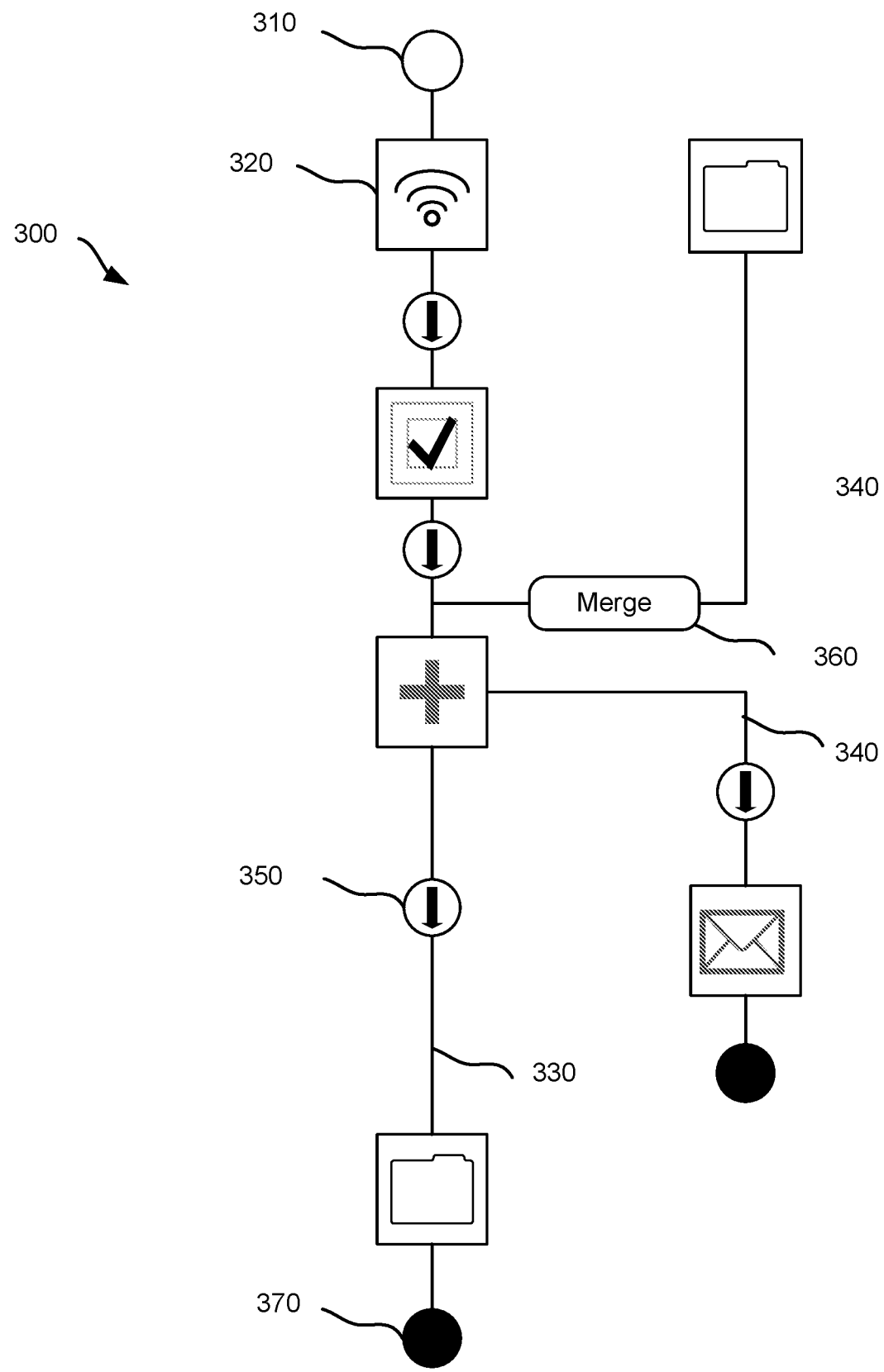
FIG. 3 illustrates an example of a workflow development, according to certain embodiments of the present disclosure.

FIG. 3 illustrates an example of a workflow development, according to certain embodiments of the present disclosure. A workflow 300 can be visualized in a workflow assembly area of a workflow assembly applications as a set of icons and connections therebetween, where each icon corresponds to a node of the workflow. As illustrated in FIG. 3, the visualization includes a start indicator 310, an icon 320, a connector line 330, a branch 340, a flow control indicator 350, a flow control label 360, and an end indicator 370.

The start indicator 310 indicates a start point of the workflow 300 and/or of the branch 340. Conversely, the end indicator 370 indicates an end point of the workflow 300 and/or the branch 340. As such, the start indicator 310 and end indicator 370 are terminus indicators.

The icon 320 indicates a node that has been added to the workflow 300. The node can be a process to be performed upon execution of the workflow 300, where the process can be defined using executable code. In the workflow model, the node is indicated using a node identifier. The placement location of the icon 320 indicates where the node is in the workflow 300 relative to other nodes. In the workflow model, the placement location is indicated by using a graph structure, where the node identifier is referenced using parent/child relationships. At the placement location, the icon 320 can be selected to configure the node (e.g., define its parameters). Further, the icon 320 can be re-located to another placement location, resulting in an update to the underlying workflow model (e.g., to the execution sequence and the inputs and outputs of the executable code).

The connector line 330 connects two icons, thereby representing a connection between the two corresponding nodes. In the workflow model, the connection can be indicated by referencing the node identifier of the first node in the object representing the second node, and vice versa. Similarly, a connector line can be between a start indicator and an icon or between an icon and an end indicator.

The branch 340 can be a portion of the workflow that branches out from another portion of the workflow. The branch 340 can include one or more icons connected to an icon of the other portion of the workflow 300.

The flow control indicator 350 can be superimposed on top of a connector line 330 to indicate the directional flow of data between the two corresponding connected nodes. The workflow model represents the directional flow in the information about the execution sequence. In comparison, the flow control label 360 can be superimposed on top of a connector line 330 to indicate a behavior (e.g., a function) of the flow between the two corresponding connected nodes. For instance, an indication of data merger, true/false branching, or other functions can be provided. In the workflow model, such functions can be defined as nodes.

Any of the above components can be edited (e.g., modified, removed, or the like) via the workflow assembly application. An edit results in an update to the workflow model. Further, an edit can be subject to assembly rules (e.g., a start indicator and an end indicator should exist, an updated placement location is subject to the node type of the corresponding nodes and the other nodes defined in the workflow model, or the like).

Other functionalities related to the interacting with the workflow are possible. In an example, encapsulation is possible, whereby a set of nodes (or, equivalently, a portion of the workflow) can be encapsulated together as a single node and presented as a single icon. An interaction with this icon (e.g., a click thereon) can expand it to show the icons corresponding to the encapsulated nodes. At the workflow model level, the encapsulated nodes can be modeled as a single node that includes three nodes (e.g., this encapsulation node nests the nodes according to their hierarchy in the portion of the workflow). Similarly, the entire workflow of a plurality of nodes can be encapsulated and represented by a single node. This encapsulation node can be added to another workflow and can be expanded to view and interact with any one of the plurality of nodes. Such encapsulation approaches provide the capability to encapsulate a collection of nodes within a workflow for the purposes of re-usability and abstraction of functionality. Users can optionally expand the nodes contained within this encapsulation in order to review, but this grouping of functionality would otherwise be a black box. This encapsulated functionality is handled at a system level as a workflow on its own and, therefore, the encapsulated functionality supports the same lifecycle as a standard workflow—including sharing, permissioning, scheduling, and the like.

In another example, zoom in and zoom out functionalities are possible. A zoom out can result in representing a set of nodes of the workflow with a single icon (e.g., a container). This zoomed out icon can provide contexts about the represented nodes (e.g., information, such as a list of the nodes or their node types). Upon a zoom in, the presentation of this icon can be expanded to shown the icons corresponding to the nodes. The zoom in and out functionality need not alter the workflow model and correspond to a mere visual encapsulation, whereby the rendering of this workflow model on the GUI can be adjusted based on the zoom level. The workflow assembly application can allow the user to change the view zoom level. Zooming out allows the user to view the complete contents of complex workflows while zooming in reveals increasing fidelity and node details.

Figure 4:
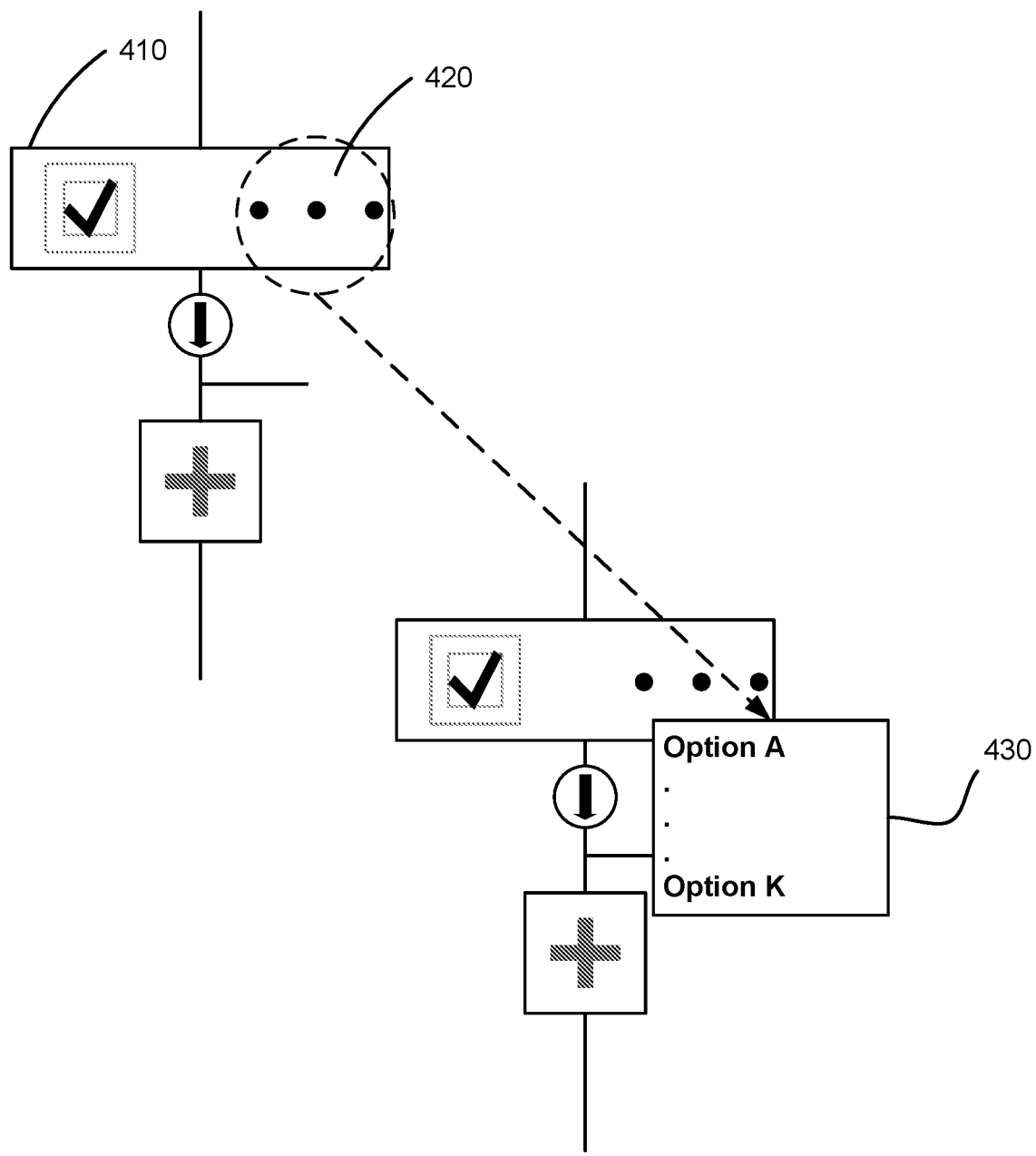
FIG. 4 illustrates an example of configuring a node of a workflow, according to certain embodiments of the present disclosure.

FIG. 4 illustrates an example of configuring a node of a workflow, according to certain embodiments of the present disclosure. The node is represented by an icon 410. A user interaction 420 with the icon 410 (e.g., a single-click thereon) or with a particular area of the icon 410 (e.g., a clickable area indicated with the three dots in the example of FIG. 4) can expose a context-sensitive menu 430 of options that can be applied to that node. Some of the options relate to actions that can be performed, such as editing, deleting, replacing, etc. Other options relate to configuring the node, such as by defining its parameters (e.g., the specific data source, the specific data destination, the specific data transformation or function to be applied by the data transformation, etc.). The different option types can be presented in the same menu or can be organized in different menus (including some of which can be presented in the workflow assembly area and other ones can be presented in the menu area.

Figure 5:
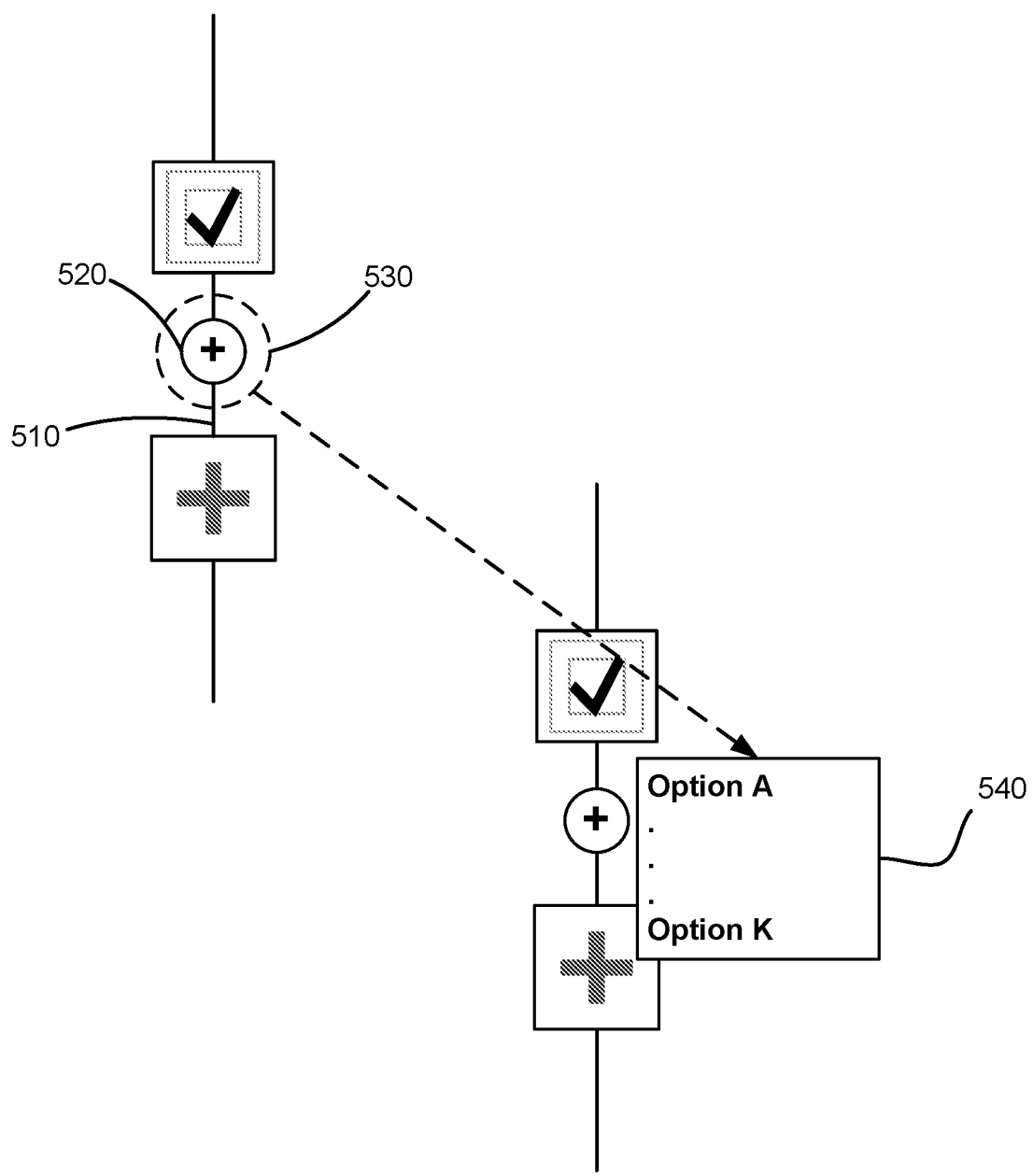
FIG. 5 illustrates an example of configuring a connection of a workflow, according to certain embodiments of the present disclosure.

FIG. 5 illustrates an example of configuring a connection of a workflow, according to certain embodiments of the present disclosure. The connection is represented with a connector line 510. A visual indicator 520 (shown as a plus sign in a circle) can be superimposed on top of the connector line 510 to indicate that a menu 540 can be invoked to edit the connector line 510. Upon a user interaction 530 with the visual indicator 520 (a click thereon), the menu 540 is presented and includes multiple options for actions that can be applied to the connector line 510.

These actions can include, for instance, editing the connector line 510 to change the behavior (e.g., reverse the data flow), change to the type of the connector line (e.g., a flow through, a conditional connection, a branch, a merge connection, or an exit point), or insert an additional icon for a new node to be added to the workflow.

Figure 6:
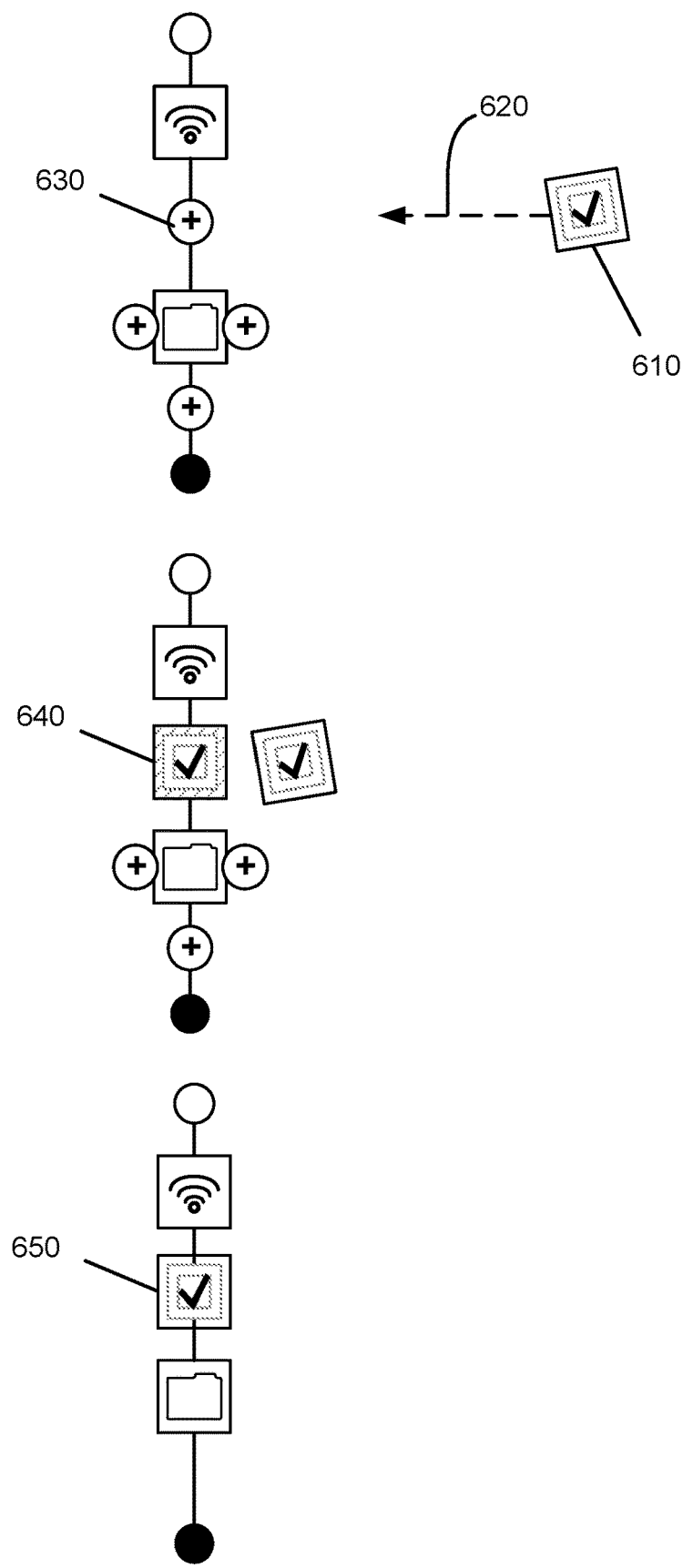
FIG. 6 illustrates an example of adding a node to a workflow, according to certain embodiments of the present disclosure.

FIG. 6 illustrates an example of adding a node to a workflow, according to certain embodiments of the present disclosure. Generally, terminus indicators and node connector lines are static, non-interactive, and appear automatically at the beginning and end of every workflow branch to denote where a process begins and where it ends. The process of assembling a complete workflow necessitates addition of nodes between the workflow's start and end indicators. To do so, a user needs to first determine which node from the collections of nodes to use, where the new node should be placed within the existing workflow, and then add the node's icon from the menu area to that location within the workflow assembly area. Workflows can involve hundreds of nodes and extremely complex sequences of transformations and other processes. The flow of data and the sequence of execution of nodes may also include flow branching, flow merging, decision points, and other asynchronous or non-linear flows, all of which add further complexity to the visual representation of a workflow.

In order to reduce visual noise, logically organize related nodes, minimize overly complex flows, and dramatically simplify the cognitive load needed of a user when assembling, maintaining, and understanding complex workflows, several workflow mechanisms can be used including tips, visual guidance, previews and layout constrains.

In an example, tips are in-application, context-sensitive textual content that appear to the user as pop-ups, overlays, or other UI elements that provide general guidance to the user as they attempt to perform a given task of the workflow assembly. Visual guidance and previews are illustrated in FIG. 6 and relies on a determination of possible placement locations. Layout constraints are further illustrated in the next figures.

Visual guidance is shown to the user while a node's icon is added from the menu area to the workspace assembly area (e.g., via a drag-and-drop interaction) in the form of drop zones that identify the possible placement locations where the icon can be dropped. These drop zones are displayed based on the node type of the node being added to the workflow, the node types of nodes already in the workflow, and the position of such nodes relative to each other or the terminus indicators. Such drop zones determination can rely on assembly rules, whereby the node type and the process identifier are used in a look up of the assembly rules. Drop zones appear overlaid on top of applicable flow control indicators and to either side of existing node icons where a branch in the workflow would be allowed. These drop zones give a clear visual indicator of where the node's icon can be placed based on otherwise obscure or complex assembly rules. Flow control indicators where the node cannot be placed do not display drop zones and do not allow icon-dropping into that location or show node previews at that location.

As a node's icon gets close to a drop zone, the workflow can be re-arranged in order to present a preview of how this icon will appear once it is in the drop zone. This preview can include a partially transparent node indicator. In order to make room for this node indicator, the icons and other visual elements downstream of the node indicator on the current flow branch can be shifted downwards. Increasingly complex workflows may necessitate the shifting of more visual elements along with entire branches in order to make room for the preview. This mechanism can also give the user a preview of how the entire workflow will need to be re-arranged in order to accommodate a new node at the target location. The user can use this visual data to help inform their node placement decisions.

As illustrated in FIG. 6, the user selects an icon 610 representing a node and performs a drag-and-drop interaction 620 thereon to move the icon 610 from the menu area to the workflow assembly area. Given the node type and the existing workflow model, the assembly rules identify possible placement locations. These placement locations are shown as drop zones using visual indicators 630 (illustrated as a plus sign in a circle). Upon approaching one of the visual indicators (e.g., the distance between the visual indicator and the icon 610 is less than a threshold number of pixels), the visual indicator is replaced with a preview 640 of the icon 610. Upon placement at the drop zone, the workflow is re-arranged as needed and the placed icon 650 is shown as being connected in the workflow.

Figure 7:
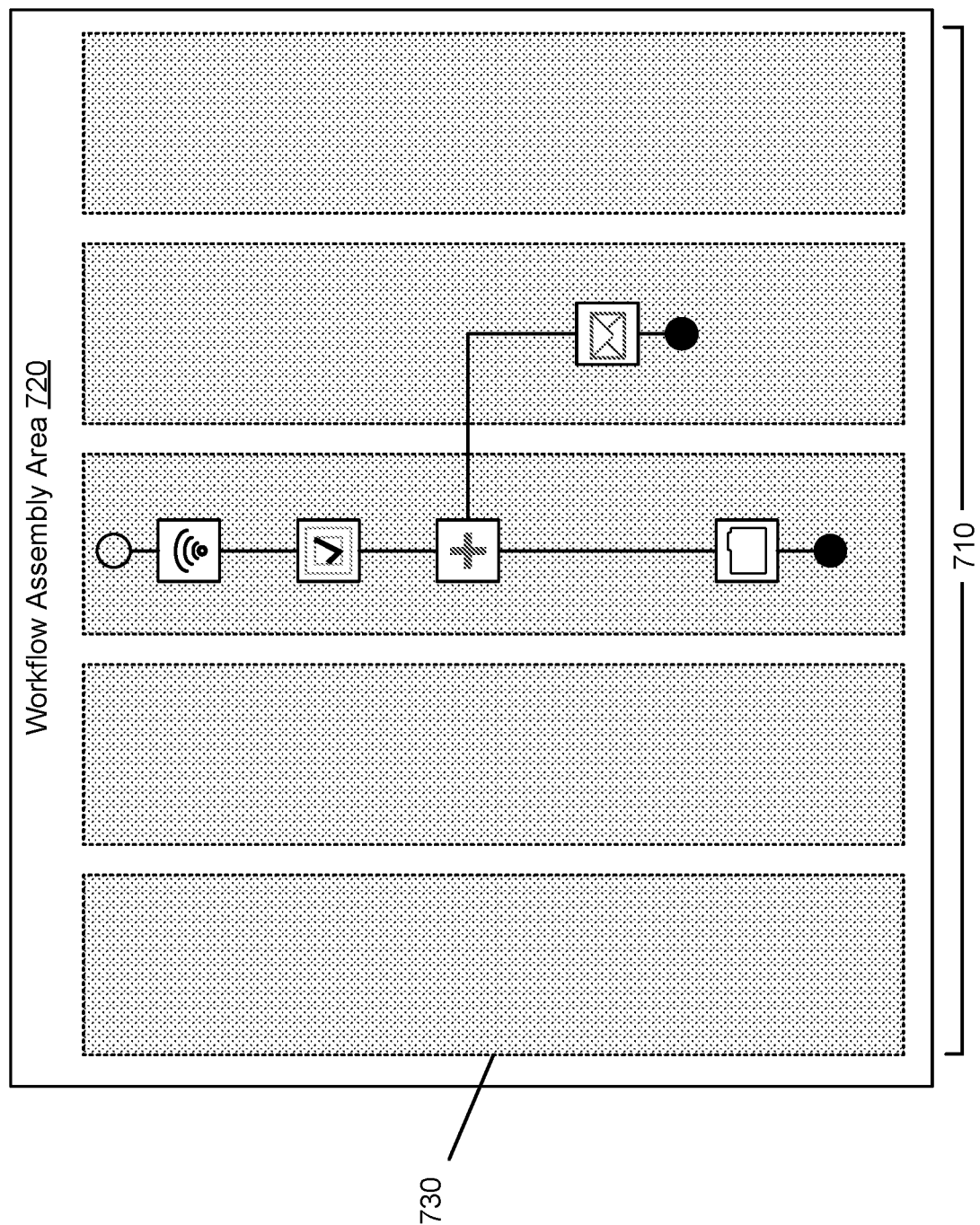
FIG. 7 illustrates an example of layout constraints for a workflow development, according to certain embodiments of the present disclosure.

FIG. 7 illustrates an example of layout constraints 710 for a workflow development, according to certain embodiments of the present disclosure. Generally, the layout constraints 710 can be imposed to the display of UI elements in a workflow assembly area 720 in order to reduce visual clutter. However, the layout constrains 710 do not impose limits on the definition of the underlying workflow model.

In an example, the visualization of the workflow is oriented from top to bottom such that nodes (as visualized with corresponding icons) are aligned with each other in a columnar grid layout 730. This vertical stacking and alignment of nodes reduces visual noise by disallowing unaligned elements. This arrangement further reduces visual noise by allowing node connector lines between sequential nodes on the Y axis to display as straight up-and-down lines with no curves, angles, or overlapping/crossing lines. This arrangement also allows branches and merges in the workflow to be represented with no more than one ninety degree angle in any connector line between nodes.

The workflow assembly application can automatically re-arrange terminus indicators, icons, connector lines, flow control indicators, and flow control labels to accommodate the layout constraints 710. A preview of a desired re-arrangement can be shown during the preview phase of the drag-and-drop process. The workflow assembly application can further attempt to optimize layout such that to avoid the crossing of connector lines between unrelated flow branches wherever possible. Doing so allows the user to easily follow the connector lines between icons regardless of the physical distance between them.

Figure 8:
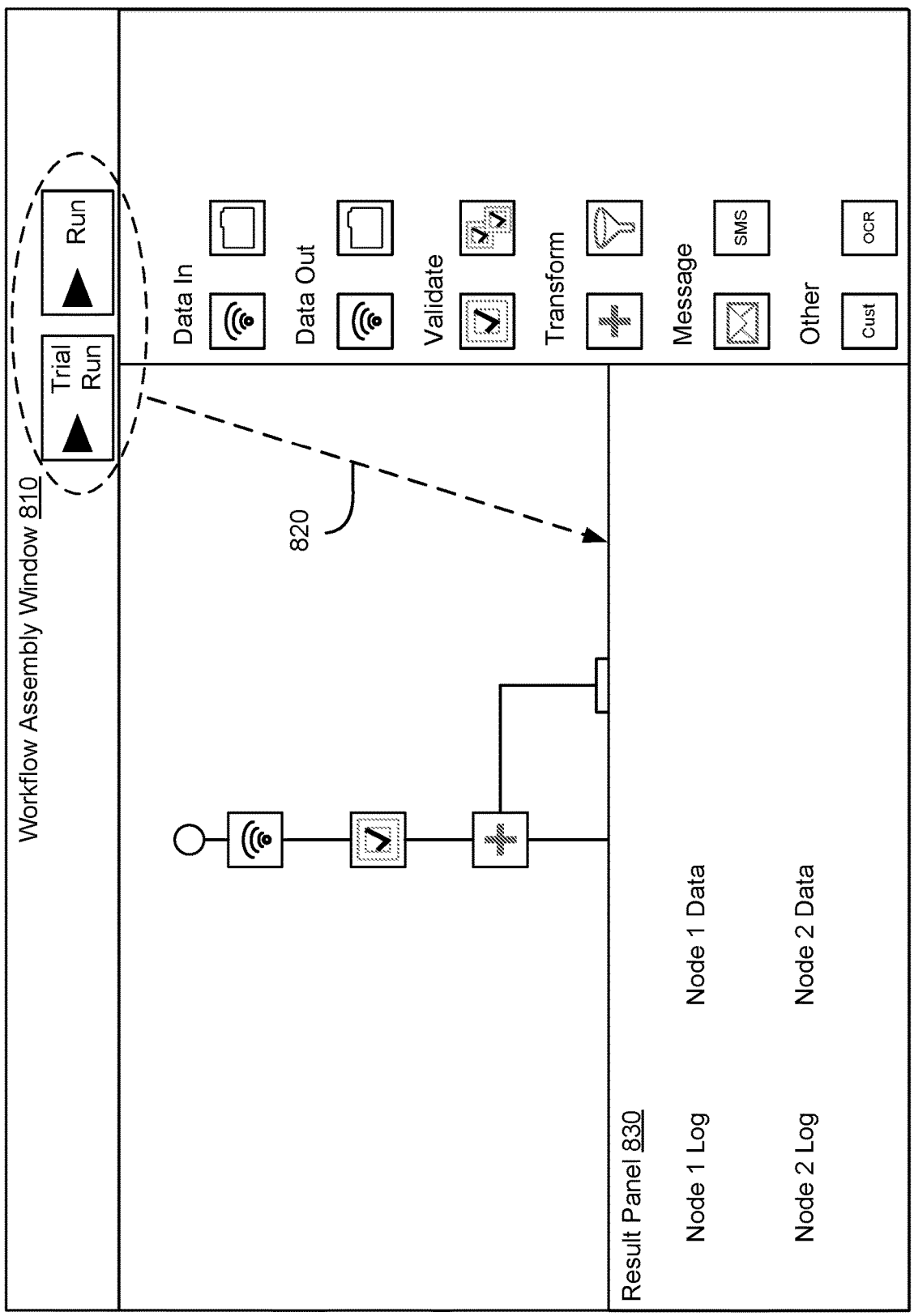
FIG. 8 illustrates an example of a result available upon an execution of a workflow, according to certain embodiments of the present disclosure.

FIG. 8 illustrates an example of a result available upon an execution of a workflow, according to certain embodiments of the present disclosure. In example, the workflow is defined by using a workflow assembly application. In a workflow assembly window 810, the workflow assembly application presents options to execute the workflow. A user selection 820 of one of these options (e.g., selecting a trial run or a run) triggers an execution of the workflow. The execution can be performed at a remote system (e.g., the computer system 220 of FIG. 2) or locally at the user device executing the workflow assembly application (e.g., the user device 210 of FIG. 2, where the user device 210 can make calls to the library 226 of the workflow platform 221). The execution results in a result panel 830 that is presented in an area within the workflow assembly window 810 (e.g., an area superimposed over a workflow assembly area).

Different types of information can be available in the result panel 830. In an example, the result panel 830 can show success or failure messages output from each node along with simple metadata produced by a given node (e.g., number of rows processed). If an error is detected for the node, an error indicator can also be superimposed over the node's icon in the workflow assembly area. In another example, the result panel 830 can include a summary of the data input, a summary of the data output, and a summary of the node-processed data. The data input can be available from a data source. The data output can be stored in a data destination. The node-processed data represents intermediary, transient data that a node generates and outputs to another node. The intermediary, transient data can be stored in a data store temporarily and can be accessible to a user to verify that a node has performed the expected operations at any step). The summaries can be linked to the data source, data destination, and data store such that, if a user selection of a summary is received, the relevant data can be presented in the workflow assembly window 810.

Furthermore, the result panel 830 can include log messages. These log messages allow users to troubleshoot the workflow during its authoring. The user may interact with a log message to retrieve particular data, determine a particular output from a node or the workflow (e.g., this particular type of data was processed and this particular type of output was successfully generated), or add particular notes (e.g., user-specified documentation). Such log messages, or portions thereof can be used to explain the purpose of the workflow in various contexts (e.g., can be used to show content about the workflow/nodes in support of zooming in and out functionalities).

Figure 9:
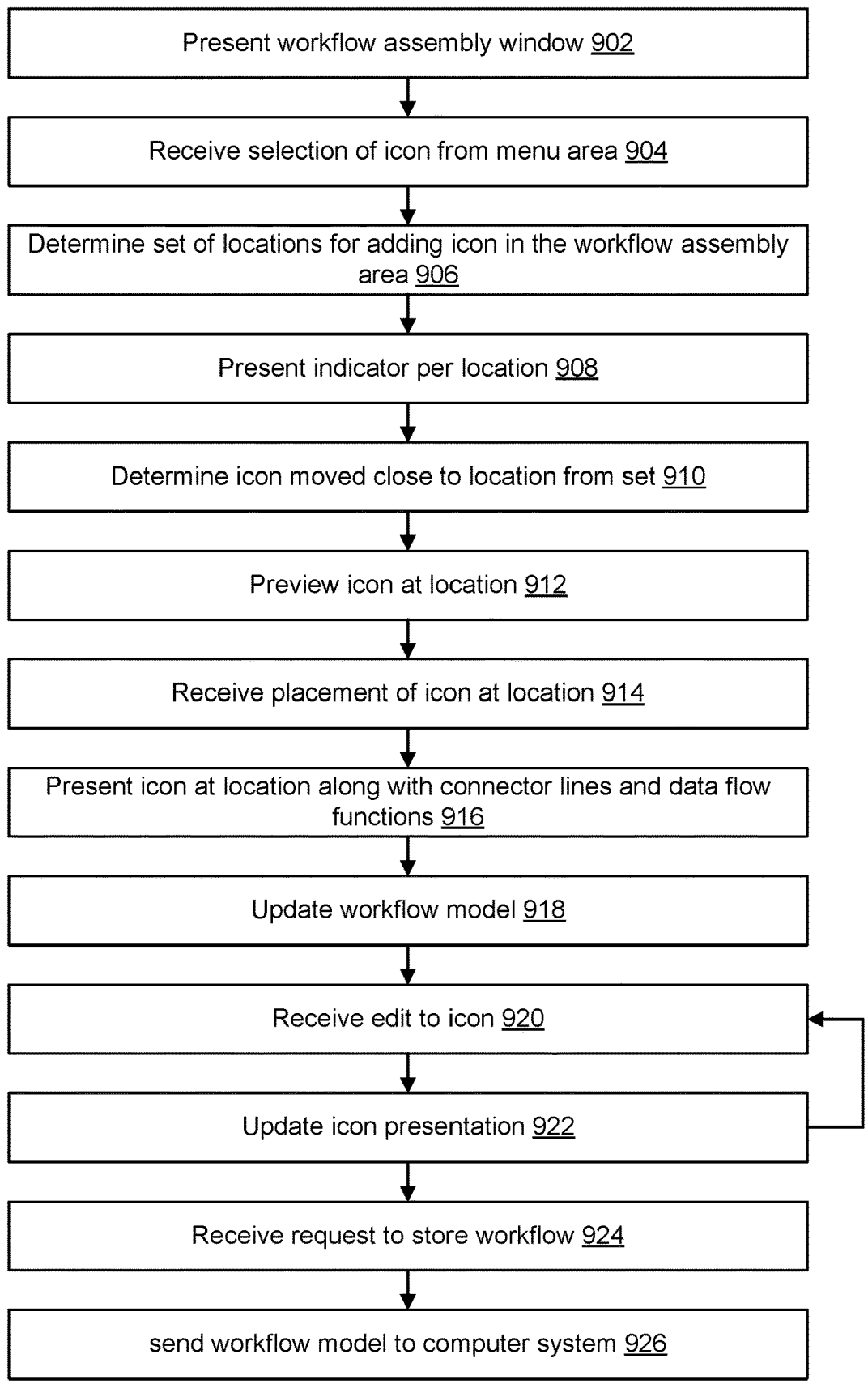
FIG. 9 illustrates an example of a process for assembling a workflow, according to certain embodiments of the present disclosure.

FIG. 9 illustrates an example of a process for assembling a workflow, according to certain embodiments of the present disclosure. Operations of the process can be performed by a device, such as the user device 210 of FIG. 2. Some or all of the instructions for performing the operations can be implemented as hardware circuitry and/or stored as computer-readable instructions on a non-transitory computer-readable medium of the device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

As illustrated in FIG. 9, the process can start at operation 902, where the device presents a workflow assembly window in a UI. For example, the device executes a workflow assembly application, such as the workflow assembly application 212 of FIG. 2. The workflow assembly window can include a menu area and a workflow assembly area, such as the menu area 120 and the workflow assembly area 130 of FIG. 1.

At operation 904, the device receives a selection of an icon from the menu area. The icon corresponds to a node type for a node that can be added to a workflow. The selection can be a down-click or a finger touch on the icon, where the click or the finger touch can start a drag and drop operation.

At operation 906, the device determines a set of locations for adding the icon in the workflow assembly area (or, equivalently, for adding the node to the workflow). For example, the set of locations can be determined based on a set of assembly rules and represent drop zones. This sect can specify the possible placement locations given the node type and types of other nodes already added to the workflow, if any.

At operation 908, the device presents a visual indicator per location. For example, the visual indicators can be shown on connector lines and next to existing icons. Additionally, constraint layouts can be imposed to the presentation of visual indicators and to how the connector lines can be routed, such that the placement of the icon does not violate a constrain layout.

At operation 910, the device determines that the icon moved close to a placement location from the set of locations. In an example, the workflow assembly application generates a measurement of the distance between the icon and the placement location, where this measurement can be expressed as a number of pixels. If the distance is less than a threshold number of pixels, the icon is determined to be close to the placement location, triggering a preview of placing the icon at that placement location.

At operation 912, the device previews the icon at the placement location. For example, the icon is presented using a particular presentation style at the placement location. The remaining components of the visualized workflow (e.g., icons, connector lines, etc.) can also be re-arranged.

At operation 914, the device receives a placement of the icon at the placement location. For example, the placement corresponds to an end of the drag-and-drop operation.

At operation 916, the device presents the icon at the placement location, along with connector lines and data flow functions. For example, the icon is shown as being connected to another icon or to a terminus point and a flow control indicator or a flow control label is superimposed on top of the connector line as applicable.

At operation 918, the device updates a workflow model of the workflow. For example, an identifier of the node and the node type are added to the workflow model, along with a reference to the executable code of the node and with information about an execution sequence that depends on the placement location and the corresponding dependency (e.g., child/parent relationship) of the node to other nodes of the workflow. Additionally, user input can be received via the workflow assembly area and can define configuration parameters of the node. The workflow model is updated to include information about the configuration parameters.

At operation 920, the device receives an edit to the icon. For example, user interaction with the icon is received in the workflow assembly area, where the user interaction can remove, relocate, or perform another action on the icon. Similarly, actions can be performed on the related connector lines, related flow connector indicators, and/or related flow control labels.

At operation 922, the device updates the presentation of the icon. For example, the icon, related connector lines, related flow connector indicators, and/or related flow control labels are updated in the workflow assembly area based on the user interaction, the assembly rules, and/or the layout constraints. The updates can result in the workflow assembly application also updating the workflow model (e.g., by updating the information about the sequence execution when, for instance, the icon is relocated).

At operation 924, the device receives a request to store the workflow. For instance, the workflow assembly window can present a save option. Additionally, the workflow assembly window can provide fields for specifying a storage location at which the workflow should be stored, sharing the workflow with other users, and/or for defining an execution schedule.

At operation 926, the device sends the resulting workflow model to a computer system such that a copy can be stored at the computer system with any other information about the execution schedule. Subsequent execution of the workflow can be performed by an execution engine of the computer system based on this copy.

Figure 10:
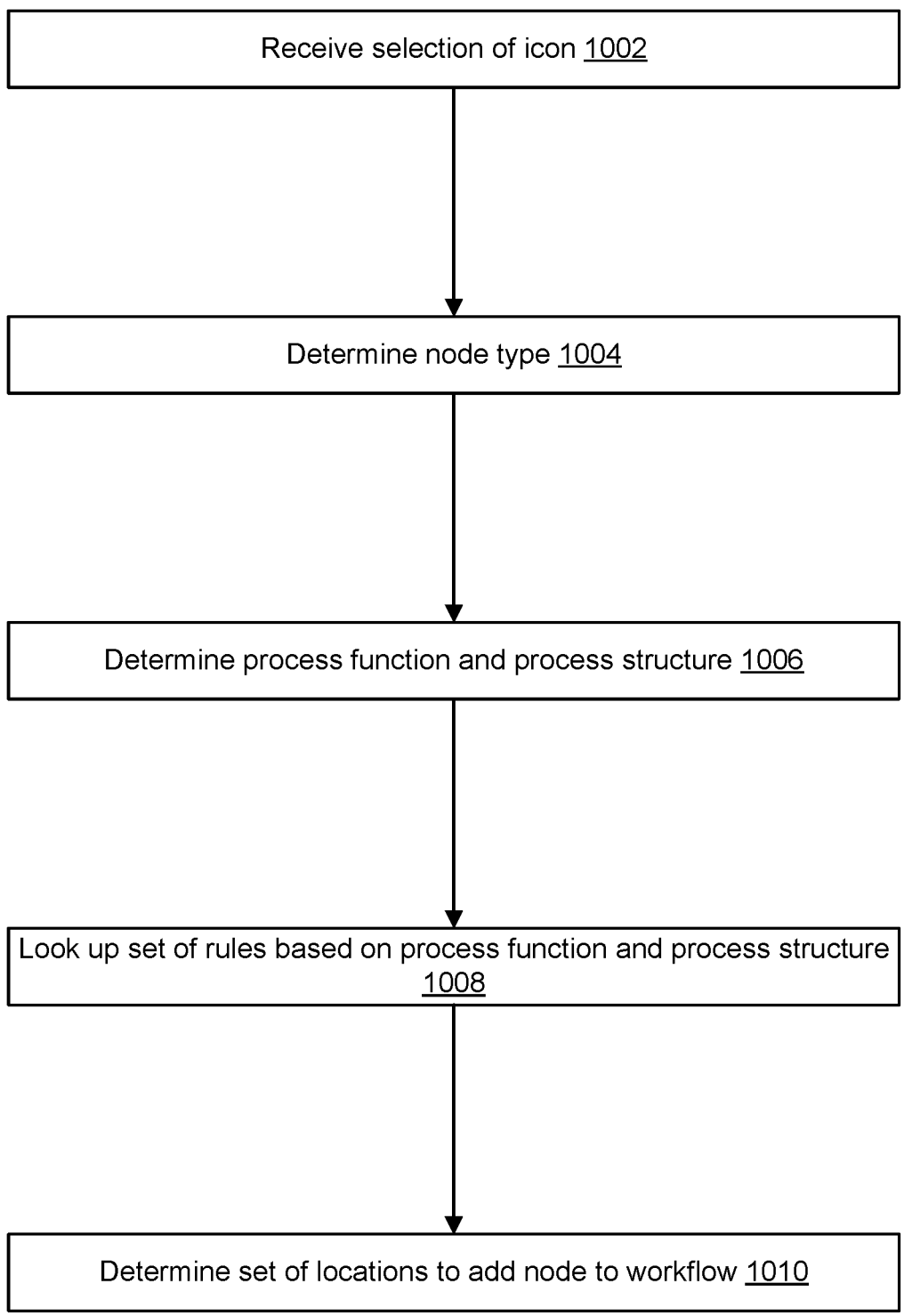
FIG. 10 illustrates an example of a process for determining node placement locations within a workflow, according to certain embodiments of the present disclosure.

FIG. 10 illustrates an example of a process for determining node placement locations within a workflow, according to certain embodiments of the present disclosure. Generally, each node of the workflow has a node type and is associated, based on the node type, with a function (e.g., a particular behavior related to data processing) and a process structure (e.g., the type of connectable nodes thereto, number of connectable nodes, number of input or output branches, or the like). Assembly rules can be defined that indicate the possible placement locations for a node given its node type and the node types of other nodes, if any, of the workflow.

In an example, the assembly rules can be semantic rules that indicate possible placement locations given the functions and the process structures. For instance, when a node is selected from the node menu, its node type is determined, function, and process structure is determined. The function is used to determine, from the semantic rules, where the node can be added given the dependency of this function on functions of other nodes of the workflow. Similarly, the process structure is used to determine, from the semantic rules, where the node can be added given the dependency of this process structure on process structures of the other nodes. The intersection of the two sets of locations can indicate the possible placement locations.

To illustrate, a workflow already includes a data in node and a data out node. A data transformation node is to be added. Given the type of this node (e.g. data transformation), the function depends on at least a data set such that transformation can be applied to data. Further, the process structure depends on at least a data connection via which the data set can flow to the data transformation node. As such, by looking up the semantic rules along the function and process structure dimensions, a determination can be made that the data transformation node can be placed after the data in node but before the data out node.

In an example, semantic rules can be received from a workflow platform prior to the creating of a workflow. In this case, the semantic rules can apply to all possible nodes that can be added to the workflow. In another example, semantic rules can be received as the model is being developed. In particular, upon addition of a node to the workflow, the resulting update to the workflow model is sent to the workflow platform that returns the relevant semantic rules applicable to the addition of a next node can be received. In this way, the semantic rules are customized to the current workflow. Because they are customized, their look up can be faster relative to the first example, thereby improving the overall UI responsiveness. In yet another example, the semantic rules are not received from the workflow platform. Instead, the workflow assembly application indicates to the workflow platform the workflow identifier and the node identifier of the node to be added to the workflow. In response, the workflow platform indicates to the workflow assembly application the possible placement locations.

The operations of the process of FIG. 10 can be implemented as sub-operation of operation 906 of FIG. 9. As illustrated in FIG. 10, the process can start at operation 1002, where the device receives a selection of an icon. The icon corresponds to a node type of a node to be added to a workflow. At operation 1004, the device determines the node type of the icon. The node type can be predefined for each icon selectable from a menu area. At operation 1006, the device determines process function and process structure of the node type. The process function can specify the behavior of the node, whereas the process structure can define the structure needed for the node in the workflow. The process function and process structure can be predefined per node type.

At operation 1008, the device looks up a set of rules based on the process function and process structure. For example, the set of rules include semantic rules. The process function can depend on process functions of other nodes of the workflow. Similarly, the process structure can depend on the current structure of the workflow, such as on the placement of the other nodes. The semantic rules can be predefined to account for these dependencies. For instance, a first rule relates to the process function and indicates a first set of placement locations given the process function. A second rule relates to the process structure and indicates a second set of placement locations given the process structure.

At operation 1010, the device determines, based on the look up, a set of locations available to add the node to the workflow. For instance, the look up can be a semantic search using the process function and the process structure, where this search returns an intersection of both sets as the set of locations.

Figure 11:
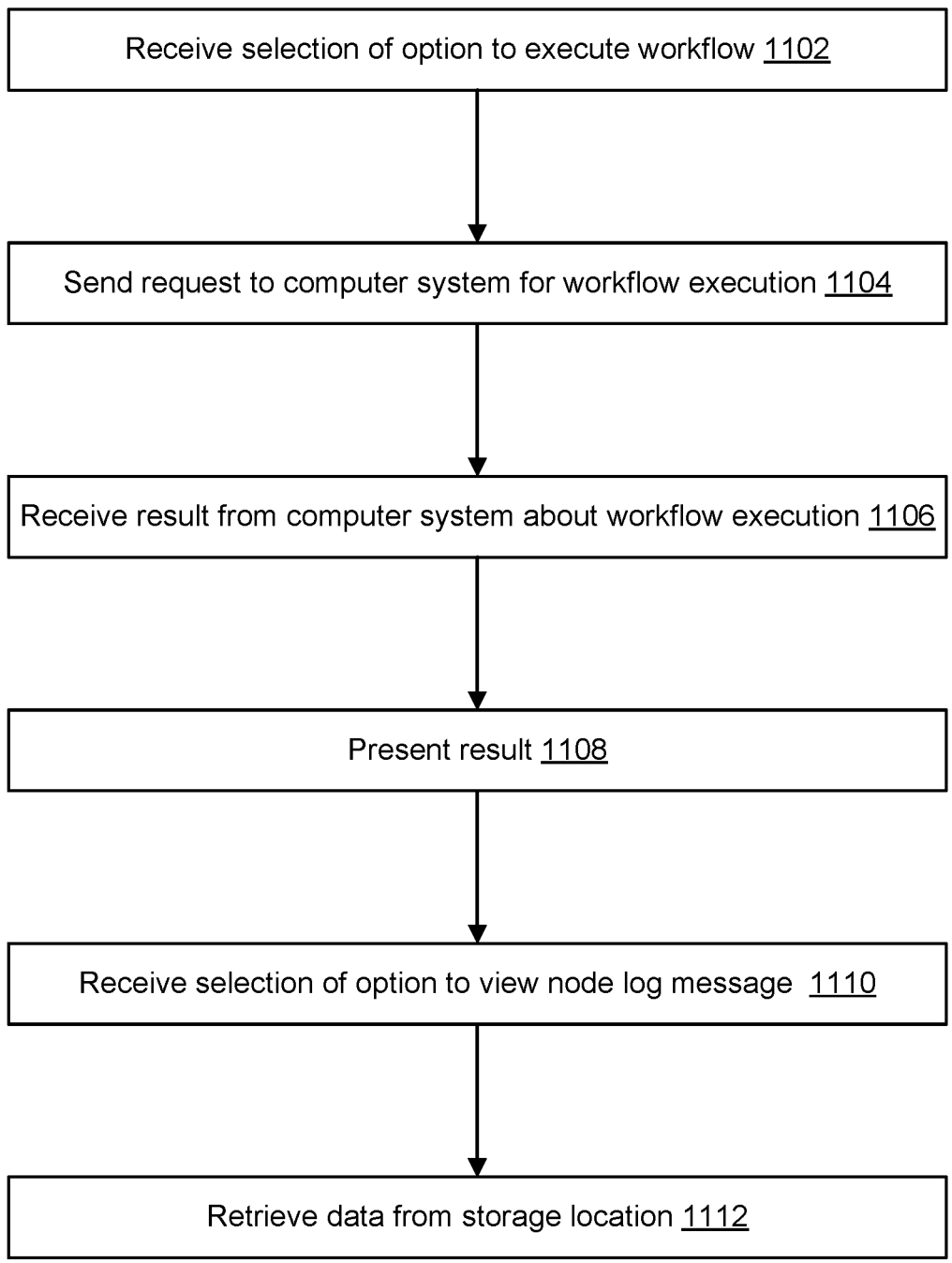
FIG. 11 illustrates an example of a process for triggering a workflow execution, according to certain embodiments of the present disclosure.

FIG. 11 illustrates an example of a process for triggering a workflow execution executing a workflow, according to certain embodiments of the present disclosure. Operations of the process can be performed by a device, such as the user device 210 of FIG. 2. This device may, but need not, be the same as the device that performs the processes described in FIGS. 9 and 10. Some or all of the instructions for performing the operations can be implemented as hardware circuitry and/or stored as computer-readable instructions on a non-transitory computer-readable medium of the device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

As illustrated, the process can start at operation 1102, where the device receives a selection of an option to execute the workflow. This selection can be received via a user interface of a workflow assembly application of the device and can indicate a manual trigger or an automated trigger (e.g., that defines a scheduled execution or that indicates a subscription to an event type).

At operation 1104, the device sends a request to a computer system for a workflow execution. The computer system can store a workflow model of the workflow and a library of executable codes referenced in the workflow model. The request can include an identifier of the workflow. In the case of an automated trigger, the request can also identify parameters of this trigger such that the computer system can execute the workflow upon detecting the trigger given the parameters.

At operation 1106, the device receives a result from the computer system about the workflow execution. For example, the result includes log messages, such as data reports, data analytics, error reports, and/or links to input data, output data, or node-processed data.

At operation 1108, the device presents the report. For example, the result is presented in a result panel of the workflow assembly window. At operation 1110, the device receives a request to view a node log message. The node log message can correspond to the portion of the report specific to a node of the workflow and can include, for instance, an error report about the processing by the node and/or a link to the relevant node-processed data.

At operation 1112, the device retrieves data from the storage location. For example, this data is the relevant node-processed data and is retrieved from a data store based on the link. The retrieval can occur upon user interaction (e.g., a click) on the node log message. In response, the data is presented in the workflow assembly window (e.g., in the result panel).

Figure 12:
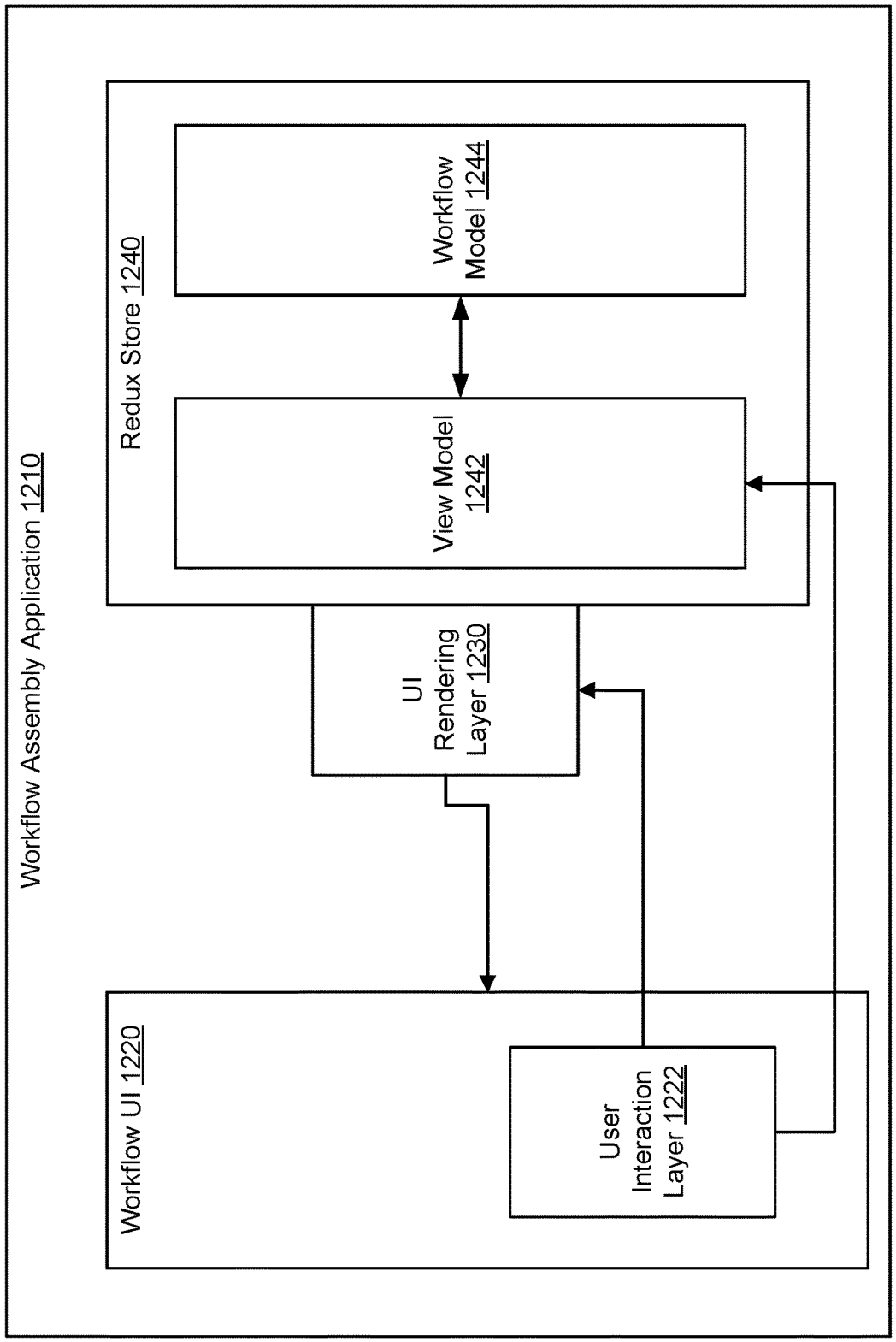
FIG. 12 illustrates an example of modules of a workflow assembly application, according to certain embodiments of the present disclosure.

FIG. 12 illustrates an example of modules of a workflow assembly application 1210, according to certain embodiments of the present disclosure. The modules can be implemented as program codes and include a workflow UI 1220, a user interaction layer 1222, a UI rendering layer 1230, and a redux store 1240 having a view model 1242 and a workflow model 1244. The workflow UI 1220 is configured to present a workflow assembly window. The user interaction layer 1222 is configured to detect user interactions (e.g., drag-and-drop interactions) and provide related information to the UI rendering layer 1230 such that previews and visual guidance can be provided and to the view model 1242 such that the icons representing the node and the overall visualized workflow is updated (in which case the view model 1242 can update the workflow model 1244). The UI rendering layer 1230 is configured to render the workflow including, for instance, the icons representing its nodes, the connector lines, the flow control indicators, the flow control labels, the visual guidance, and the previews. The view model 1142 stores node view objects that can be used to view (e.g., visualize) the nodes of the process. The workflow model 1244 can be a JSON model that stores JSON objects, each corresponding to a node and its related properties (e.g., connection to other nodes, reference to executable code, etc.). Updates from the user interaction layer 1222 can drive updates to the view model 1242 and, in turn, to the workflow model 1244. Updates to the workflow model 1244 can be sent to a computer system that provides backend functionalities, such as the computer system 220 of FIG. 2.

In an example, the workflow model 1244 is the data model that serves as the intermediate data transformation layer between the workflow assembly application 1210 the computer system and, therefore, can be synchronized consistent with the computer system's workflow model definitions. The workflow model 1244 can include a list of workflow node models that correspond to the backend processing steps in the workflow, as well as the connections and termini. An instance of workflow model 1244 is a list of JSON objects that represent workflow nodes/connections/termini with a number of attributes including node category/type, positions, connections, a parent identifier (ID) list and a child ID list, as well as the configurations that the backend needs for running the workflow. Any update from the workflow UI 1220 are transformed into workflow model 1244 before passing it back to the backend.

The view model 1242 may include multiple logical layers, such as a UI layer and an operation layer. In the UI layer, a number of workflow node view types are implemented, each of which wraps a workflow node object and exposes APIs and attributes used for UI rendering and operations. The view model 1242 can include a list of node view objects that correspond to different backend steps processing data streams. Except for the node attributes inherited from the node objects of the workflow model 1244, each node view object maintains a parents list and children list that contains the pointers of their parent node objects and child node objects, thereby establishing the relationships between nodes and their execution order. This doubly-connected graph structure can help the workflow assembly application 1210 to quickly locate related nodes without traversing the entire graph (or iterate all node IDs) and thus speed up the workflow operations. The operation layer is built on top of the UI layer, where a number of basic operations are implemented for manipulating a workflow view model instance, such as traverse, find, insert, remove, update, etc. This layer wraps the logics to handle the UI operations and only exposes APIs to the higher layer, which helps to reduce complexity. The UI layer is stored in the state store in the workflow assembly application 1210 and is considered as the single source of truth for rendering the workflow UI. For example, if the user adds a new node to the workflow, the workflow assembly application 1210 updates the UI layer through the operation layer in order to show the new node in the workflow assembly window.

In the UI rendering layer 1230, the view model 1242 is virtualized by implementing a UI rendering layer that draws a flow diagram with a node template panel using HTML, and CSS. This layer 1230 intakes the view model 1242 and converts it into a user-friendly graphic interface. The entire diagram layout information, including node position and connections, etc. are created in the view model 1242 and saved to the backend. A matrix representing a grid structure is used to map the position and connections of a node and track the updates. When a node's position is altered, it is moved it from one grid cell to another grid cell and its connections are updated accordingly. A new workflow is created with a fixed number of pre-existing nodes such as Input and Output, whose positions are pre-defined in the layout of the new workflow. A workflow layout is propagated following a set of rules, whereby, for instance, the position of a new node inserted in to the workflow is derived from the existing workflow layout using the position of the target drop zone. For example, if a new node is dropped before an existing node, the new node will take the existing node's position, and the existing node and all its downstream nodes will be shifted down by one grid cell. It is the view model instance that rules how the workflow UI is rendered, instead of the other way around. Any update in the workflow view model instance is reflected in the UI. Also, the view model instance is updated first in order to reflect accurate node positioning for the rendering.

In the user interaction layer 1222, a library is used to build a drag-and-drop (and other user interaction) experience that allows the user to insert a predefined workflow node into the existing workflow by dragging a node icon and dropping it to a workflow assembly area. The predefined node types are first loaded and then rendered as node type icons in a menu area. Each of the node types is marked as user interaction source with a unique node type ID. When the user starts to drag one of these icons from the menu area into the workflow assembly area, user interaction source APIs can tell whether and which type is being dragged by looking at the type ID associated with that icon. Each of the existing workflow nodes can be defined as a drop target with a unique node ID (or multiple targets depending on the drop location). When the user moves a node type icon over an illuminated drop zone or drops an icon into a target drop zone, the drop zone APIs can tell the position that the user wants to insert the new node by providing the target node ID. A drop preview experience is added to the UI and is activated when the workflow assembly application 1210 detects the dragged node type icon hovering above the target node or predefined drop zone. When the user drops the node type icon at a target, the view model operations implemented in the view model 1242 are used to insert a new node into the workflow graph structure at the desired position. And since the workflow assembly application 1210 knows the new node's type, the new node's attributes can be initiated accordingly. The insertion of the new node then triggers a workflow repaint in the rendering layer that updates the workflow UI 1220 to show the new node.

Constraints may apply when a new node is inserted to the workflow, which are defined based on the type of the new node and the location that the new node is added to. The workflow assembly application 1210 can fetch the backend assembly algorithm as a JSON object along with the workflow data, and use the algorithm to find and activate valid drop zones for a new node by looking at the types and attributes of its upstream and downstream nodes.

Removing and updating an existing node from the workflow is easier to accomplish since the workflow assembly application 1210 can easily find the node ID from the UI component upon the user's selection, and thus can find the node object to remove or update. Immediately after a new node is added to or an existing node is removed from the workflow in the view model 1242, the workflow assembly application 1210 automatically converts all the nodes from the view model 1242 back to the workflow model 1244, and saves the updates to the backend. The workflow assembly application 1210 also saves to the backend via the same mechanism when the user clicks on the node configuration's save button after modifying an existing node's attributes. The auto save call to the backend is an asynchronous process which does not block the user from further editing the workflow. Since the view model 1242 is the single source of truth for a workflow, an auto save call sends the most updated workflow to the backend. In case one of the auto save calls fails, the next auto save call can still save the workflow with all previous updates. A warning banner is displayed on the UI to notify the user of any save failures so that the user can manually trigger additional update attempts. Two continuous auto save calls made in a very short time period may possibly arrive at the backend in a reversed order due to network latency. To guarantee the backend saves the newest updates, the workflow assembly application 1210 includes in the request a timestamp representing the moment when the workflow update is made. The backend drops the save request if the save request contains an earlier timestamp comparing to that of the workflow in the database.

Figure 13:
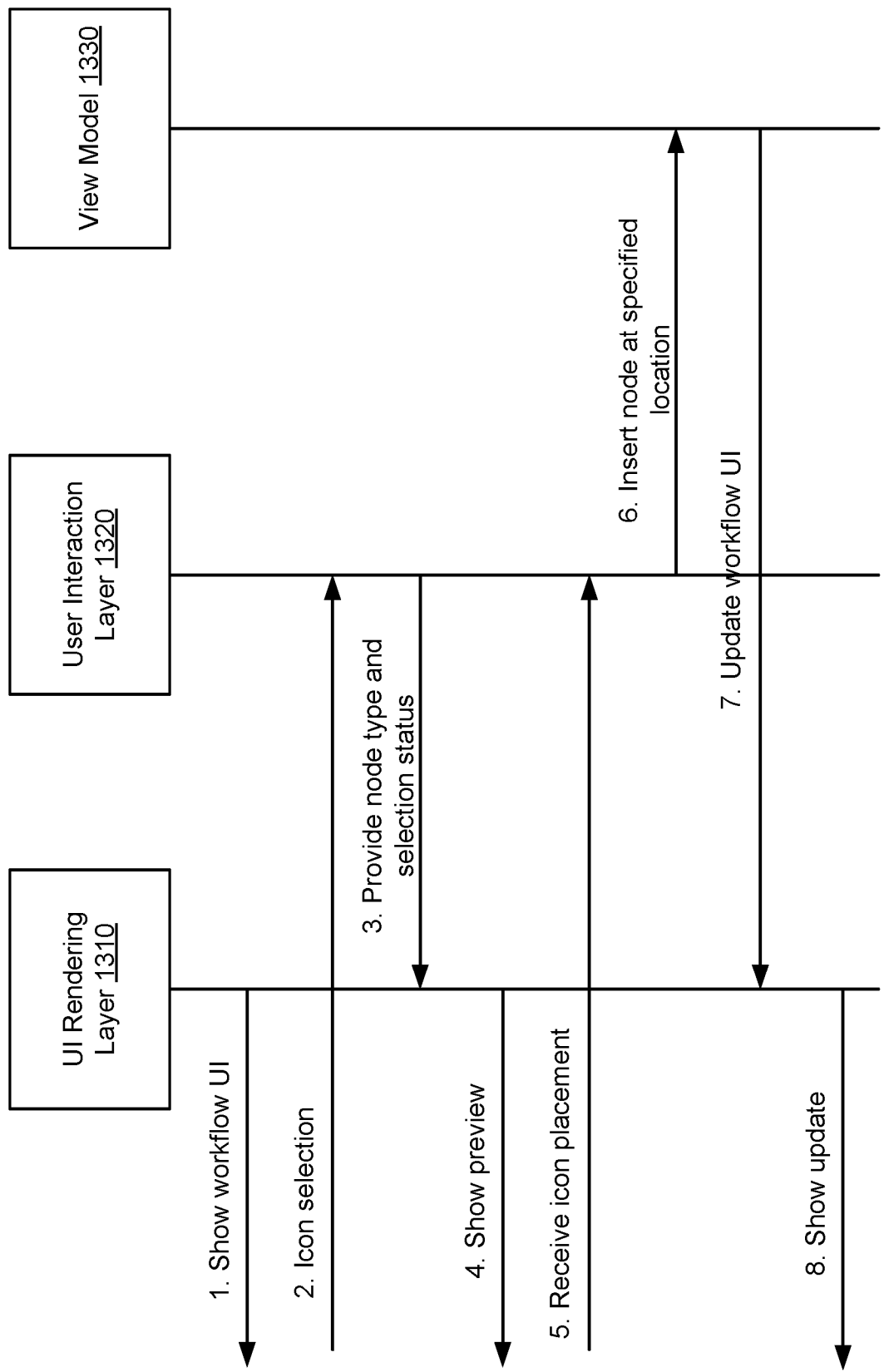
FIG. 13 illustrates an example of a sequence diagram using modules of a workflow assembly application, according to certain embodiments of the present disclosure.

FIG. 13 illustrates an example of a sequence diagram using modules of a workflow assembly application, such as the workflow assembly application 1210 of FIG. 12, according to certain embodiments of the present disclosure. As illustrated, a UI rendering layer 1310 shows a workflow UI. An icon selection is received by a user interaction layer via the workflow UI. In response, the user interaction layer 1320 provides a node type (or an icon type) and a selection status (e.g., whether a drag-and-drop is ongoing and is in close proximity to a data connector or a shown icon) to the UI rendering layer 1310. In turn, the UI rendering layer 1310 shows a preview. Next, an icon placement is received and corresponds to a placement of the icon in a drop zone. In response, the user interaction layer 1320 updates a view model 1330 about inserting a corresponding node at the specified location. The view model 1330 updates the workflow UI to then show the update in the UI.

Figure 14:
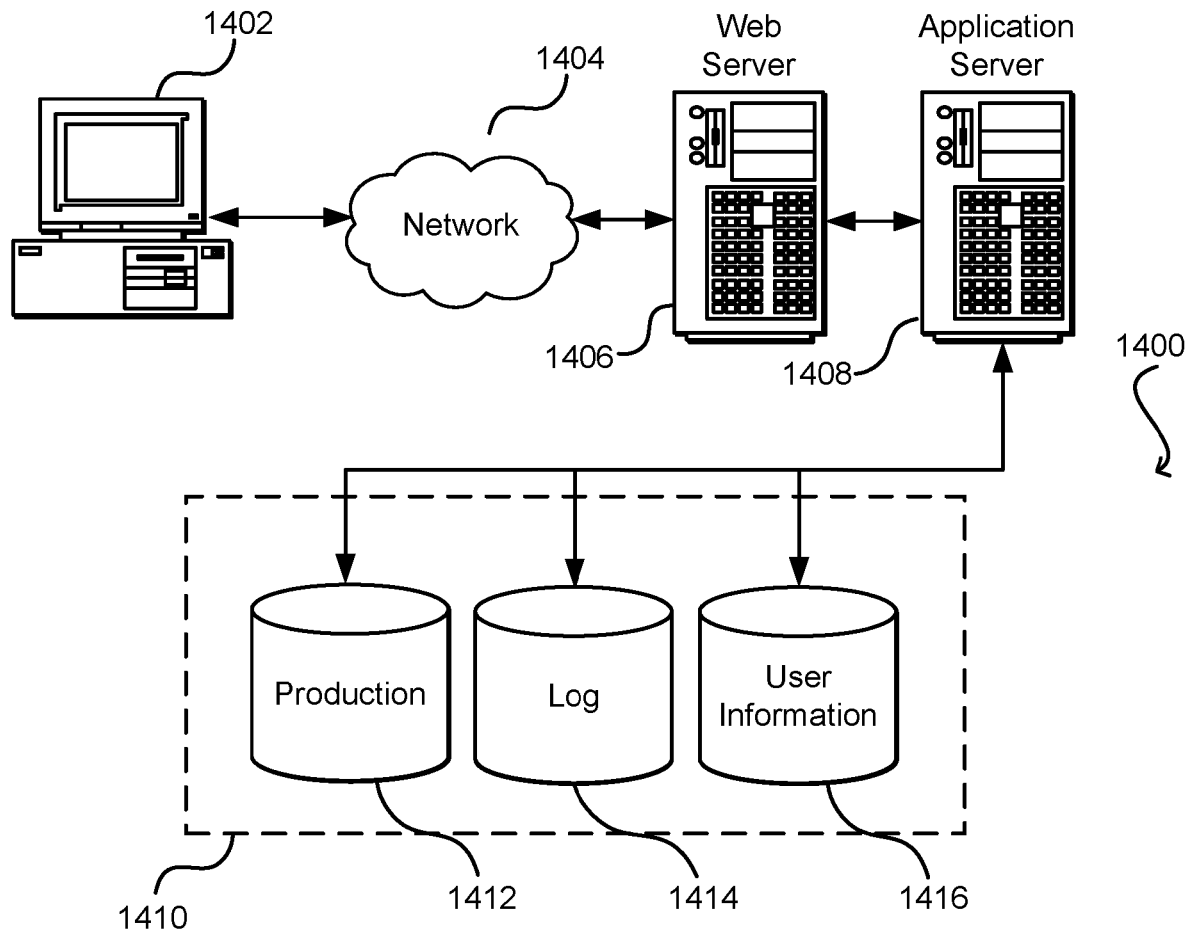
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402 (such as any of the devices described herein above), which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server 1406. It should be understood that the Web and application servers are not required and are merely example components.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1402.

Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the example environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented on a device, the method comprising:
   receiving, via a user interface, a selection of an icon corresponding to a node that has a node type and for which executable code is predefined to perform data manipulation associated with the node type;
   determining, based at least in part on a set of rules, a set of locations where the node can be added to a workflow, the set of rules indicating the set of locations based at least in part on the node type and a workflow model of the workflow;
   presenting, via the user interface, a set of indicators, each indicator of the set of indicators indicating a corresponding location of the set of locations;
   receiving, via the user interface, a placement of the icon at a location of the set of locations, the placement corresponding to an indicator of the set of indicators; and
   updating the workflow model to include, based at least in part on the placement, a reference to the executable code predefined for the node.

2. The method of claim 1 further comprising:
   presenting, via the user interface, a plurality of icons, each one of the plurality of icons representing a selectable node for addition to the workflow, wherein the icon is selected from the plurality of icons; and
   presenting, via the user interface, the icon at the location.

3. The method of claim 1, wherein the workflow model is further updated to include, based at least in part on the location, information about an execution sequence of executable codes referenced in the workflow model.

4. The method of claim 3, wherein runtime execution of the workflow model includes the data manipulation based at least in execution of the executable codes according to the execution sequence.

5. The method of claim 3, wherein the icon and the node are a first icon and a first node, respectively, and wherein the method further comprises:
   receiving, via the user interface, a selection of a second icon corresponding to a second node;
   presenting, via the user interface, a connection between the first icon and the second icon, the connection indicating a data flow between the first node and the second node, wherein the information about the execution sequence represents the data flow in the workflow model.

6. The method of claim 3 further comprising:
   sending, to a computer system, the workflow model;
   receiving, from the computer system, information about runtime execution of the workflow model, the runtime execution includes inputting data from a data source to a first executable code of the executable codes and, upon execution completion of the first executable code, inputting output data of the first executable code to a second executable code of the executable codes.

7. The method of claim 6 further comprising:
   presenting, via the user interface, an option to review data corresponding to an output of the node;
   receiving, via the user interface, a selection of the option;
   receiving, based at least in part on the selection of the option, the data from a storage location; and
   presenting, via the user interface, the data.

8. The method of claim 1 further comprising:
receiving, via the user interface, a first configuration of the node, the first configuration indicating a data source for data to be processed by the workflow at runtime;
identifying the data source in the workflow model;
receiving, via the user interface, a second configuration of a trial run of the workflow, the second configuration indicating a portion of the data from the data source to be processed by the workflow during the trial run; and
causing execution of the workflow model for the trial run based at least in part on the portion of the data.

9. A device comprising:
one or more processors; and
one or more memories storing computer readable instructions that, upon execution by the one or more processors, configure the device to:
receive, via a user interface, a selection of a node representation corresponding to a node that has a node type and for which executable code is predefined to perform data manipulation associated with the node type;
determine, based at least in part on a set of rules, a set of locations where the node can be added to a workflow, the set of rules indicating the set of locations based at least in part on the node type and a workflow model of the workflow;
present, via the user interface, a set of indicators, each indicator of the set of indicators indicating a corresponding location of the set of locations;
receive, via the user interface, a placement of the node representation at a location of the set of locations, the placement corresponding to an indicator of the set of indicators; and
update the workflow model to include, based at least in part on the placement, a reference to the executable code predefined for the node.

10. The device of claim 9, wherein the one or more memories store further computer readable instructions that, upon execution by the one or more processors, configure the device to:
receive, via the user interface, configuration information for the node based at least in part on the node type; and
store the configuration information in the workflow model.

11. The device of claim 9, wherein the one or more memories store further computer readable instructions that, upon execution by the one or more processors, configure the device to:
receive, via the user interface, an updated placement of the node representation, the updated placement corresponding to an updated location of the node in the workflow; and
update the workflow model by at least updating information about an execution sequence.

12. The device of claim 9, wherein the one or more memories store further computer readable instructions that, upon execution by the one or more processors, configure the device to:
present, via the user interface, a connection between the node representation and anode node representation having an existing placement location; and
based at least in part on the connection, include in the workflow model information about an execution sequence of executable codes referenced in the workflow model.

13. The device of claim 9, wherein the one or more memories store further computer readable instructions that, upon execution by the one or more processors, configure the device to:
receive, via the user interface, information defining a trigger for executing the workflow model;
send, to a computer system, the workflow model and the information defining the trigger;
receive, from the computer system, information about runtime execution of the workflow model based at least in part on a detection of the trigger; and
present, via the user interface, an option to review data of an output of the runtime execution.

14. One or more non-transitory computer-readable media storing instructions that, upon execution on a device, cause the device to perform operations comprising:
receiving, via a user interface, a selection of an icon corresponding to a node that has a node type and for which executable code is predefined to perform data manipulation associated with the node type;
determining, based at least in part on a set of rules, a set of locations where the node can be added to a workflow, the set of rules indicating the set of locations based at least in part on the node type and a workflow model of the workflow;
presenting, via the user interface, a set of indicators, each indicator of the set of indicators indicating a corresponding location of the set of locations;
receiving, via the user interface, a placement of the icon at a location of the set of locations, the placement corresponding to an indicator of the set of indicators; and
updating the workflow model to include, based at least in part on the placement, a reference to the executable code predefined for the node.

15. The one or more non-transitory computer-readable media of claim 14, storing further instructions that, upon execution on the device, cause the device to perform additional operations comprising
receiving, via the user interface, first user input to store the workflow;
sending, to a computer system, the workflow model based at least in part on the first user input;
receiving, via the user interface, second user input to execute the workflow;
sending, to the computer system, a request to execute the workflow model based at least in part on the second user input;
receiving, from the computer system, information about runtime execution of the workflow model; and
presenting, via the user interface, an option to review data to an output of the runtime execution.

16. The one or more non-transitory computer-readable media of claim 14 storing further instructions that, upon execution on the device, cause the device to perform additional operations comprising:
determining, based at least in part on the selection of the icon, the node type of the node; and
using the node type and an identifier of the workflow in a look-up of the set of rules to determine the set of locations.

17. The one or more non-transitory computer-readable media of claim 16, wherein the node type is associated with a process function and a process structure, and wherein the look-up uses at least one of the process function or the process structure.

18. The one or more non-transitory computer-readable media of claim 14 storing further instructions that, upon execution on the device, cause the device to perform additional operations comprising:
    presenting, via the user interface, a second icon, wherein the second icon represents (i) multiple nodes of the workflow and is presented according to a zoom level, or (ii) an encapsulation of the multiple nodes.

19. The one or more non-transitory computer-readable media of claim 14 storing further instructions that, upon execution on the device, cause the device to perform additional operations comprising:
    presenting a plurality of icons in a menu area of a window on the user interface, wherein the icon is presented in a workflow assembly area of the window, wherein the workflow assembly area shows the workflow and facilitates an edit to the workflow, wherein the edit comprises at least one of an update to the placement of the icon, a removal of the icon, or a configuration definition often node, and wherein the workflow model is updated based at least in part on the edit.

20. The one or more non-transitory computer-readable media of claim 14 storing further instructions that, upon execution on the device, cause the device to perform additional operations comprising:
    presenting, via the user interface, an indication of the node type at the node type includes at least one of: a data source, a data destination, a data processing function, a messaging function, a user-defined code, or a reporting function.

\* \* \* \* \*